US012199729B2

(12) United States Patent
He

(10) Patent No.: US 12,199,729 B2
(45) Date of Patent: *Jan. 14, 2025

(54) ENHANCEMENTS TO BEAM FAILURE RECOVERY PROCEDURE WITH MULTI-TRANSMISSION RECEPTION POINT OPERATION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,918

(22) Filed: Sep. 29, 2023

(65) Prior Publication Data

US 2024/0030993 A1    Jan. 25, 2024

Related U.S. Application Data

(63) Continuation of application No. 16/927,821, filed on Jul. 13, 2020, now Pat. No. 11,831,380.

(60) Provisional application No. 62/884,015, filed on Aug. 7, 2019.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0617* (2013.01); *H04L 5/0051* (2013.01); *H04W 72/046* (2013.01); *H04W 74/0833* (2013.01); *H04W 76/19* (2018.02); *H04W 80/02* (2013.01)

(58) Field of Classification Search
CPC ... H04B 7/0695; H04B 7/0617; H04L 5/0051; H04L 5/001; H04L 5/0023; H04L 5/0032;
(Continued)

(56) References Cited

U.S. PATENT DOCUMENTS

2011/0286327 A1    11/2011 Chen et al.
2020/0196383 A1*    6/2020 Tsai ..................... H04L 1/1614
(Continued)

FOREIGN PATENT DOCUMENTS

CN    109219972 A    1/2019
CN    110022613 A    7/2019
(Continued)

OTHER PUBLICATIONS

International Preliminary Report on Patentability—PCT/US2020/041911—the International Bureau of WIPO—Geneva, Switzerland—Feb. 17, 2022.
(Continued)

*Primary Examiner* — Hardikkumar D Patel
(74) *Attorney, Agent, or Firm* — Procopio, Cory, Hargreaves & Savitch LLP

(57) ABSTRACT

Aspects are provided which enhance Mode 2 multi-TRP operation by allowing a UE to recover and reconfigure a failed PDCCH beam of a first TRP in a serving cell by using a second TRP which still has a working PDCCH in the same serving cell. If the first TRP undergoes beam failure but the second TRP in the same cell has an operational beam, the UE may send a beam failure indication indicating a new beam for the PDCCH of the first TRP. The base station comprising the second TRP may then reconfigure the PDCCH serving beams of the first TRP based on the beam failure indication. The reliability of a serving cell may thus be increased.

20 Claims, 14 Drawing Sheets

(51) Int. Cl.
*H04W 72/044* (2023.01)
*H04W 74/0833* (2024.01)
*H04W 76/19* (2018.01)
*H04W 80/02* (2009.01)

(58) Field of Classification Search
CPC ... H04L 5/0048; H04L 5/0053; H04L 5/0073; H04L 5/0092; H04W 72/046; H04W 74/0833; H04W 76/19; H04W 80/02; H04W 24/04; H04W 76/15
See application file for complete search history.

(56) References Cited

U.S. PATENT DOCUMENTS

| | | | |
|---|---|---|---|
| 2021/0044342 A1 | 2/2021 | He | |
| 2021/0058130 A1* | 2/2021 | Zhu | H04W 72/23 |
| 2021/0320764 A1* | 10/2021 | Gao | H04L 5/0032 |

FOREIGN PATENT DOCUMENTS

| | | |
|---|---|---|
| WO | 2018148552 A1 | 8/2018 |
| WO | 2018203710 A1 | 11/2018 |
| WO | 2019033072 A1 | 2/2019 |
| WO | 2019137472 A1 | 7/2019 |

OTHER PUBLICATIONS

International Search Report and Written Opinion—PCT/US2020/041911—ISA/EPO—Nov. 23, 2020.
Qualcomm: "Beam Failure Recovery Procedure", 3GPP Draft, 3GPP TSG RAN WG2 #92b, R1-1804788_BFRPROCEDURE, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427055, 10 Pages,10 Pages, paragraph [03.2], p. 2-p. 3, p. 5-p. 7, the whole document.

* cited by examiner

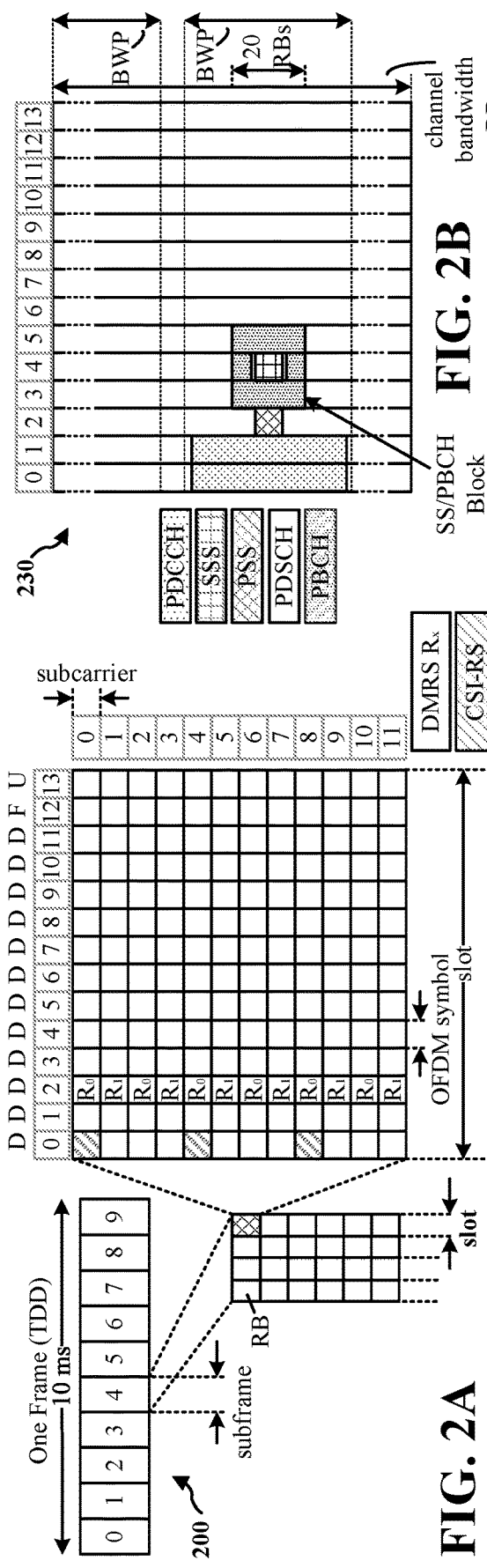
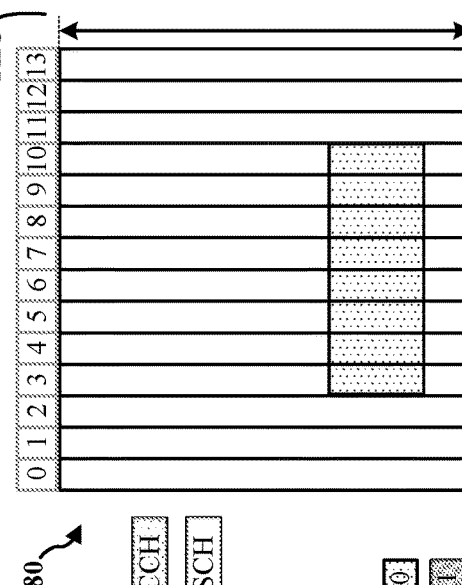
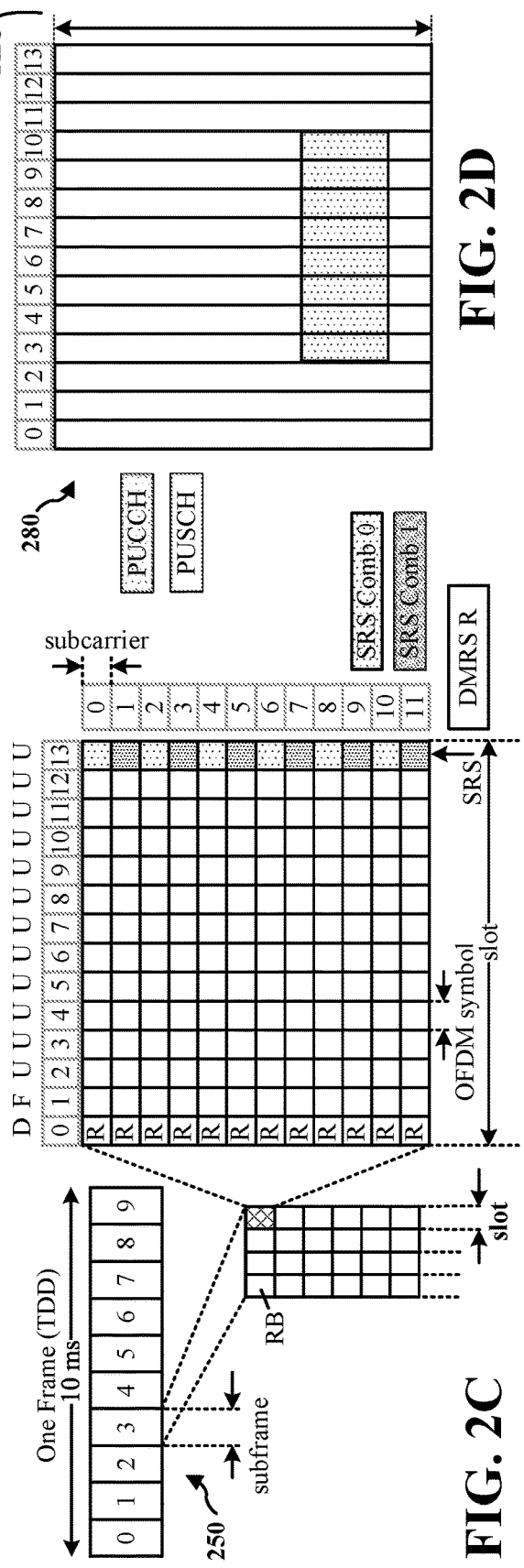
FIG. 2A
FIG. 2B
FIG. 2C
FIG. 2D

ENHANCEMENTS TO BEAM FAILURE RECOVERY PROCEDURE WITH MULTI-TRANSMISSION RECEPTION POINT OPERATION

CROSS REFERENCE TO RELATED APPLICATION(S)

This application is a continuation of U.S. application Ser. No. 16/927,821 ("the '821 application"), entitled "ENHANCEMENTS TO BEAM FAILURE RECOVERY PROCEDURE WITH MULTI-TRANSMISSION RECEPTION POINT OPERATION" and filed on Jul. 13, 2020, which is assigned to the assignee hereof and which is expressly incorporated by reference herein in its entirety. The '821 application claims under 35 USC § 119 the benefit of and priority to U.S. Provisional Application Ser. No. 62/884,015, entitled "ENHANCEMENTS TO BEAM FAILURE RECOVERY PROCEDURE WITH MULTI-TRANSMISSION RECEPTION POINT OPERATION" and filed on Aug. 7, 2019, which is assigned to the assignee hereof and which is expressly incorporated by reference herein in its entirety.

BACKGROUND

Technical Field

The present disclosure relates generally to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Multiple transmission reception points or Tx/Rx Points (TRPs) may operate to increase capacity and reliability of wireless communication systems. A TRP is typically a set of co-located TX/RX antennas providing coverage in the same sector. The set of TX/RX-points can either be at different locations or co-sited but providing coverage in different sectors, and can also belong to the same or different base stations. For example, a TRP may be a transmission panel of a base station, which generally has a single transmission element. Thus, a base station may comprise a single TRP. Alternatively, a base station may comprise multiple TRPs.

Different modes of multi-TRP (mTRP) operation may be supported in a wireless communication system. In a first mode (e.g. Mode 1), a single PDCCH is used to schedule a single PDSCH transport block (TB) from multiple TRPs in a serving cell. In a second mode (e.g. Mode 2), multiple PDCCHs are used to schedule separate PDSCH TBs from multiple TRPs in a serving cell. In Mode 2 multi-TRP operation, separate PDCCH and PSDCHs may be served using different beams. However, such beams may easily fail or be lost, for example, in response to UE movement or due to sudden presence of an obstacle interfering with the beam. As a result, UEs generally perform a beam failure detection (BFD) procedure and a beam failure recovery (BFR) procedure to keep track of possible failure of the PDCCH serving beam of each TRP.

When detecting beam failure and performing beam failure recovery in Mode 1 multi-TRP operation, the UE has to track the serving beam(s) of only one PDCCH in a serving cell. However, in Mode 2 multi-TRP operation, the UE generally has to track the serving beam(s) of two PDCCH in a serving cell (e.g. one from each TRP) for beam failure detection and recovery. For example, one or more base stations may configure dedicated PRACH resources and candidate beam sets for two TRPs in a serving cell, and the UE has to perform beam failure detection independently for each TRP based on beam failure reference signals associated with each TRP. Moreover, if strong candidate beams with sufficient link quality are unavailable to use for performing beam failure recovery, and the serving cell is a primary or special cell, the UE may be required to perform a contention-based random access procedure for each TRP to recover the PDCCH serving beam for each TRP. This process not only requires additional resources compared to Mode 1 multi-TRP operation, but a longer delay in beam failure recovery time may be incurred. Hence, it would be helpful to enhance Mode 2 multi-TRP operation.

The present disclosure enhances Mode 2 multi-TRP operation by allowing a UE to recover and reconfigure a failed PDCCH beam of a first TRP in a serving cell by using a second TRP which still has a working PDCCH in the same serving cell. For example, if the first TRP undergoes beam failure but the second TRP in the same cell has an operational beam, then rather than performing RACH on the first TRP, the UE may transmit a beam failure indication (e.g. a MAC CE) indicating a new beam for the PDCCH of the first TRP. The base station comprising the second TRP may then reconfigure the PDCCH serving beams of the first TRP based on the beam failure indication. As a result, the present disclosure may increase the reliability of a serving cell.

In an aspect of the disclosure, a method, a computer-readable medium, and an apparatus are provided. The apparatus may be a UE. The apparatus receives data from a first transmission reception point (TRP) and a second TRP in a serving cell based on a physical downlink control channel (PDCCH) of the first TRP and the second TRP. The PDCCH of the first TRP and second TRP are each received over separate beams. Moreover, the apparatus detects beam failure of the PDCCH of the first TRP, and performs beam failure recovery for the first TRP by transmitting a beam failure indication indicating a new beam for the PDCCH of the first TRP.

In another aspect of the disclosure, a method, a computer-readable medium, and an apparatus are provided. The apparatus may be a base station comprising one or more TRPs. For instance, the apparatus may be a base station in communication with a first TRP in a serving cell, and the apparatus may comprise a second TRP in the serving cell. The apparatus transmits data to a user equipment (UE) based on a physical downlink control channel (PDCCH) of the second TRP. The PDCCH of the second TRP is transmitted to the UE over a separate beam than a PDCCH of the first TRP. The apparatus receives a beam failure indication from the UE in response to a beam failure of the PDCCH of the first TRP. The apparatus configures a new beam for the PDCCH of the first TRP based on the beam failure indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
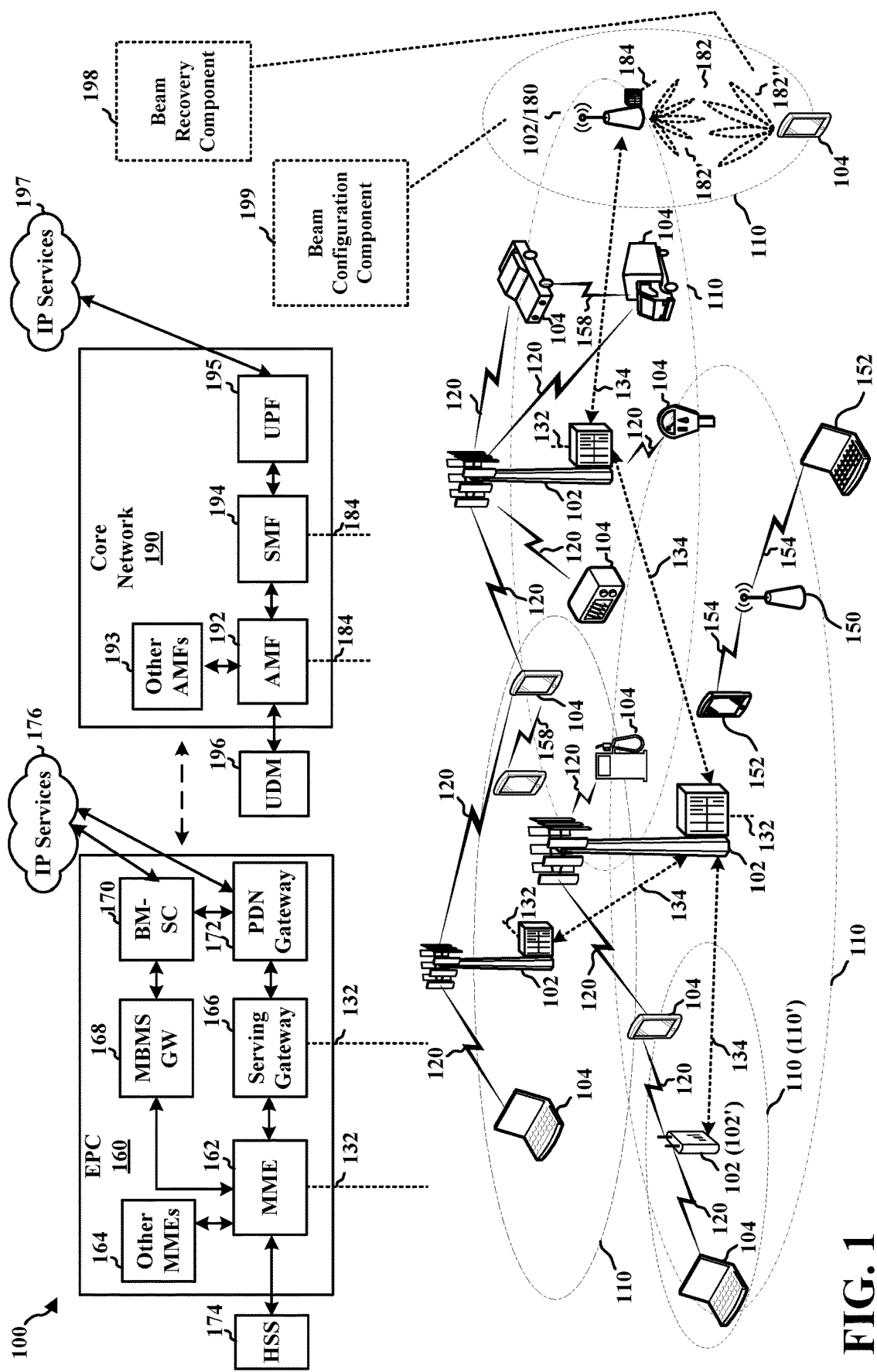
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3

GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a beam recovery component 198 which is configured to receive data from a first transmission reception point (TRP) and a second TRP in a serving cell based on a physical downlink control channel (PDCCH) of the first TRP and the second TRP, where the PDCCH of the first TRP and second TRP each received over separate beams. The beam recovery component 198 is also configured to detect beam failure of the PDCCH of the first TRP and to perform beam failure recovery for the first TRP by transmitting a beam failure indication indicating a new beam for the PDCCH of the first TRP.

Referring still to FIG. 1, in certain aspects, the base station 102/180 may include a beam configuration component 199 which is configured to transmit data to a user equipment (UE) based on a physical downlink control channel (PDCCH) of the second TRP, where the PDCCH of the second TRP is transmitted to the UE over a separate beam than a PDCCH of the first TRP. The beam configuration component 199 is also configured to receive a beam failure indication from the UE in response to a beam failure of the PDCCH of the first TRP, and to configure a new beam for the PDCCH of the first TRP based on the beam failure indication.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to 2*15 kHz, where y is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
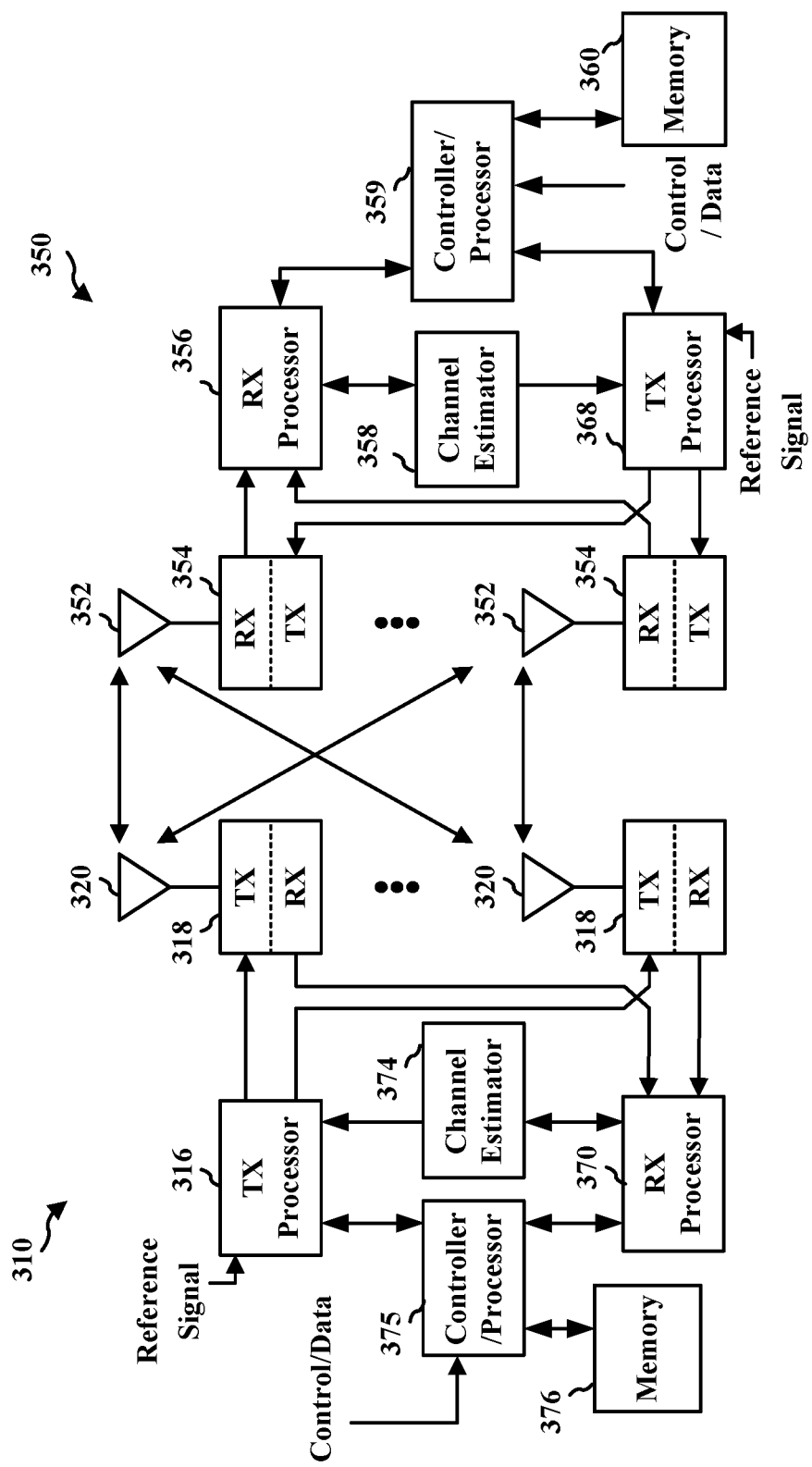
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Multiple transmission reception points or Tx/Rx Points (TRPs) may operate to increase capacity and reliability of wireless communication systems. A TRP is typically a set of co-located TX/RX antennas providing coverage in the same sector. The set of TX/RX-points can either be at different locations or co-sited but providing coverage in different sectors, and can also belong to the same or different base stations. For example, a TRP may be a transmission panel of a base station, which generally has a single transmission element. Thus, a base station may comprise a single TRP. Alternatively, a base station may comprise multiple TRPs.

Similarly, a serving cell can have multiple TRPs, with different TRPs for the same serving cell being located on different towers. For example, a serving cell may include a primary cell and any secondary cells, with each cell including one or more TRPs. A primary cell is a cell operating on a primary frequency in which the UE may perform an initial connection establishment procedure or initiates a connection re-establishment procedure with a base station. The primary cell may have a primary TRP for primarily receiving data from the UE and transmitting data to the UE. The primary cell may also have secondary TRPs for providing supplementary transmission and reception capability. Furthermore, a secondary cell may include its own primary and secondary TRPs which provide additional radio resources for a UE configured with carrier aggregation.

On top of secondary cells, a serving cell may include primary secondary cell group cells (PSCell) and special cells (SpCell) for dual connectivity operation. A primary secondary cell group cell is a cell in which a UE may perform random access with a base station when performing a reconfiguration with synchronization procedure. A special cell (SpCell) may be a primary cell (PCell) or a primary secondary cell group cell (PSCell). Thus, a serving cell may comprise a primary cell for UEs not configured with carrier aggregation or dual connectivity, while a serving cell may comprise any secondary cells or special cells for UEs configured with carrier aggregation or dual connectivity.

Figure 4:
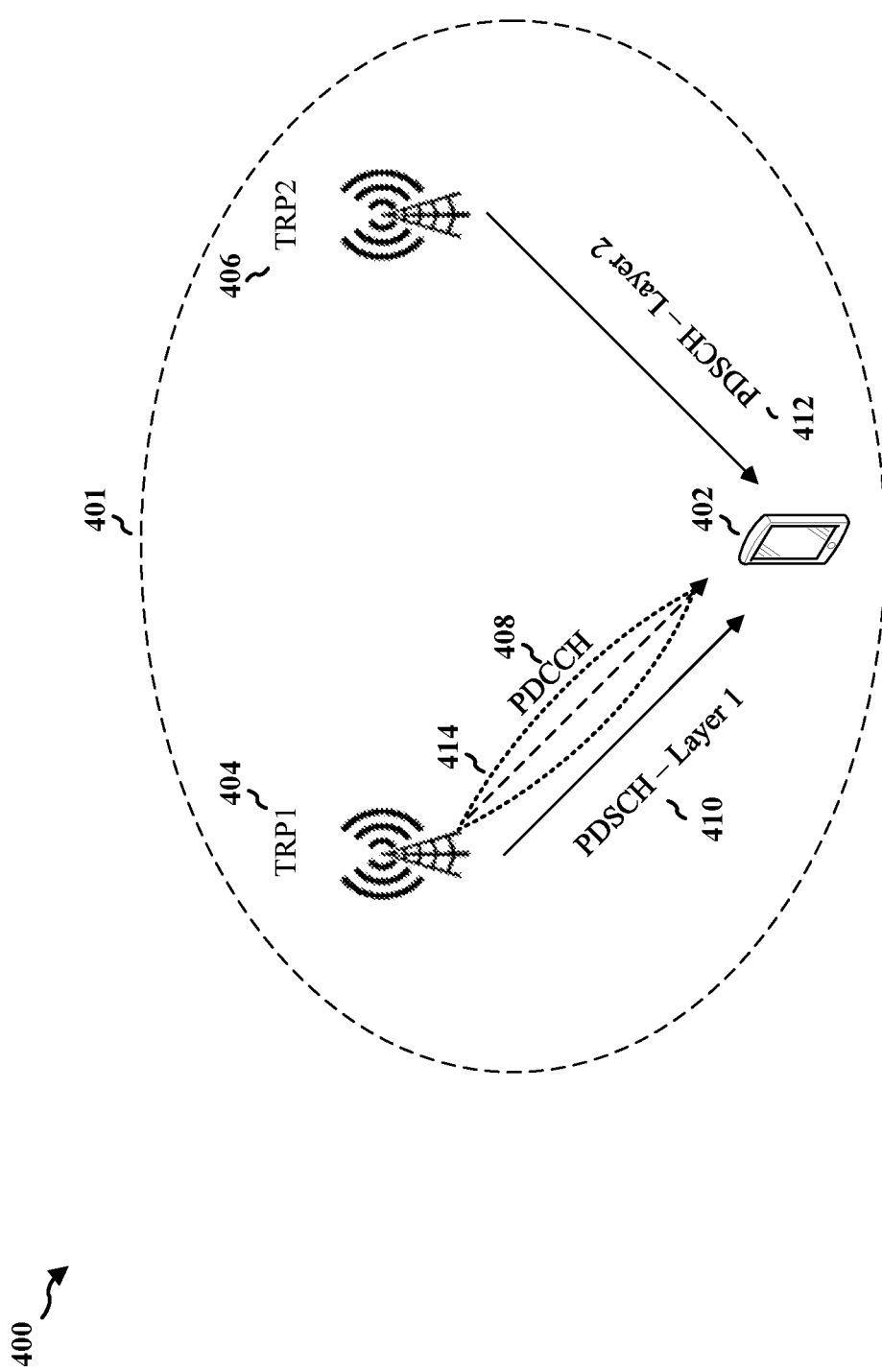
FIG. 4 is a diagram illustrating an example of Mode 1 multi-TRP operation.

Different modes of multi-TRP (mTRP) operation may be supported in a wireless communication system. In a first mode (e.g. Mode 1), a single PDCCH is used to schedule a single PDSCH transport block (TB) from multiple TRPs in a serving cell. FIG. 4 illustrates an example 400 of Mode 1 multi-TRP operation. In the example of FIG. 4, a serving cell 401 may include multiple TRPs communicating with a UE 402 (e.g. TRP 1 404 and TRP 2 406). TRP 1 404 may be a primary TRP, while TRP 2 406 may be a secondary TRP, or vice-versa. Both TRP 1 404 and TRP 2 406 may use a single PDCCH 408 (e.g. from the primary TRP) to coordinate their transmissions and schedule the same TB on their respective PDSCH 410 and 412 to UE 402, thereby increasing data throughput. For example, the different TRPs may transmit the same data on PDSCH 410 and 412 using different spatial layers in overlapping resource blocks (RBs) or symbols (e.g. spatial division multiplexing [SDM], as illustrated in FIG. 4), using different RBs in frequency (e.g. frequency division multiplexing [FDM]), or using different OFDM symbols (e.g. time division multiplexing [TDM]). Mode 1 multi-TRP operation generally requires ideal backhaul, or at least backhaul with small delay, between TRPs. Thus, TRP 1 404 and TRP 2 406 may be two sets of co-located TX/RX antennas (or two sets of one or more antenna arrays) of a single base station with ideal backhaul, or they may be from two different base stations with negligible or low latency in their coordination and transmission. Moreover, each TRP may communicate with the UE 402 using one or more beams. For example, TRP 1 404 may transmit PDCCH 408 to UE 402 using a PDCCH serving beam 414.

Figure 5:
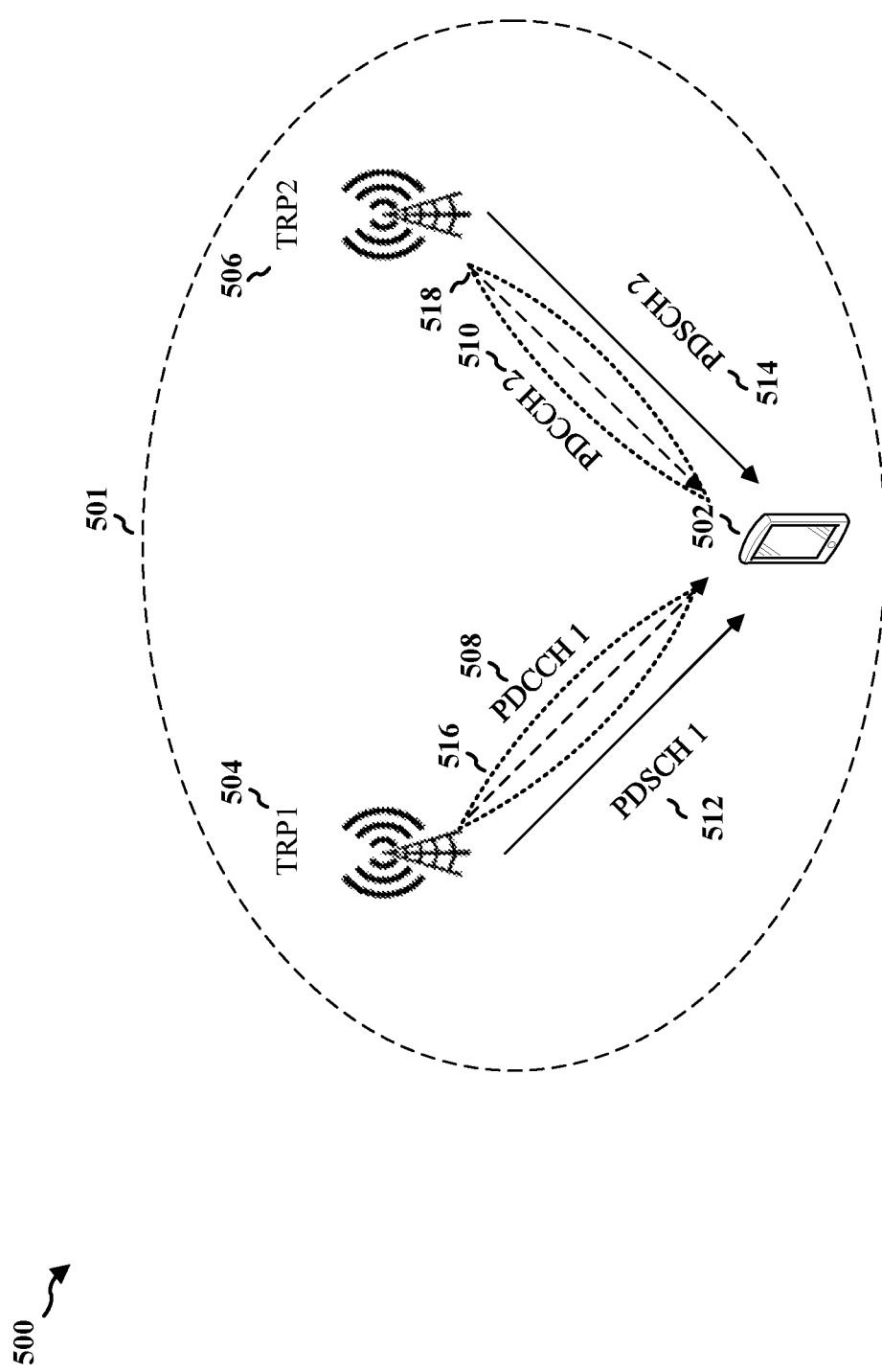
FIG. 5 is a diagram illustrating an example of Mode 2 multi-TRP operation.

In a second mode (e.g. Mode 2), multiple PDCCHs are used to schedule separate PDSCH TBs from multiple TRPs in a serving cell. FIG. 5 illustrates an example 500 of Mode 2 multi-TRP operation. In the example of FIG. 5, a serving cell 501 may include multiple TRPs in communication with a UE 502 (e.g. TRP 1 504 and TRP 2 506). TRP 1 504 may be a primary TRP, while TRP 2 506 may be a secondary TRP, or vice-versa. TRPs 504, 506 function independently by having their own PDCCH 508, 510 for separately scheduling different TBs to UE 502 on different PDSCH 512, 514. Mode 2 multi-TRP operation may be supported for TRPs with both ideal and non-ideal backhaul (e.g. significant latency or delay in communications prohibiting synchronization of operation between TRPs). Thus, TRP 1 504 and TRP 2 506 may be two sets of co-located TX/RX antennas of a single base station, or antenna arrays of two different base stations. Moreover, each TRP may communicate with the UE 502 using one or more beams. For example, TRP 1 504 may transmit PDCCH 508 to UE 502 using a PDCCH serving beam 516, while TRP 2 506 may transmit PDCCH 510 to UE 502 using another PDCCH serving beam 518.

In Mode 2 multi-TRP operation, the separate PDCCH and PSDCHs may be served using different beams. For example, to support multiple PDCCH monitoring by the UE, multiple control resource set (CORESETs) may be configured per TRP (e.g. up to 3 CORESETs or some other number) up to a maximum number of CORESETS in total (e.g. up to 5 CORESETs or some other number), thus allowing each TRP to transmit their PDCCH using multiple beams. Moreover, with millimeter wave (mmW) beamforming, beams may be precisely configured to allow TRPs to send information to and receive information from the UE at high frequencies. However, such beams may easily fail or be lost, for example, in response to UE movement or due to sudden presence of an obstacle interfering with the beam. As a result, UEs generally perform a beam failure detection (BFD) procedure to keep track of possible failure of the PDCCH serving beam of each TRP.

Figure 6:
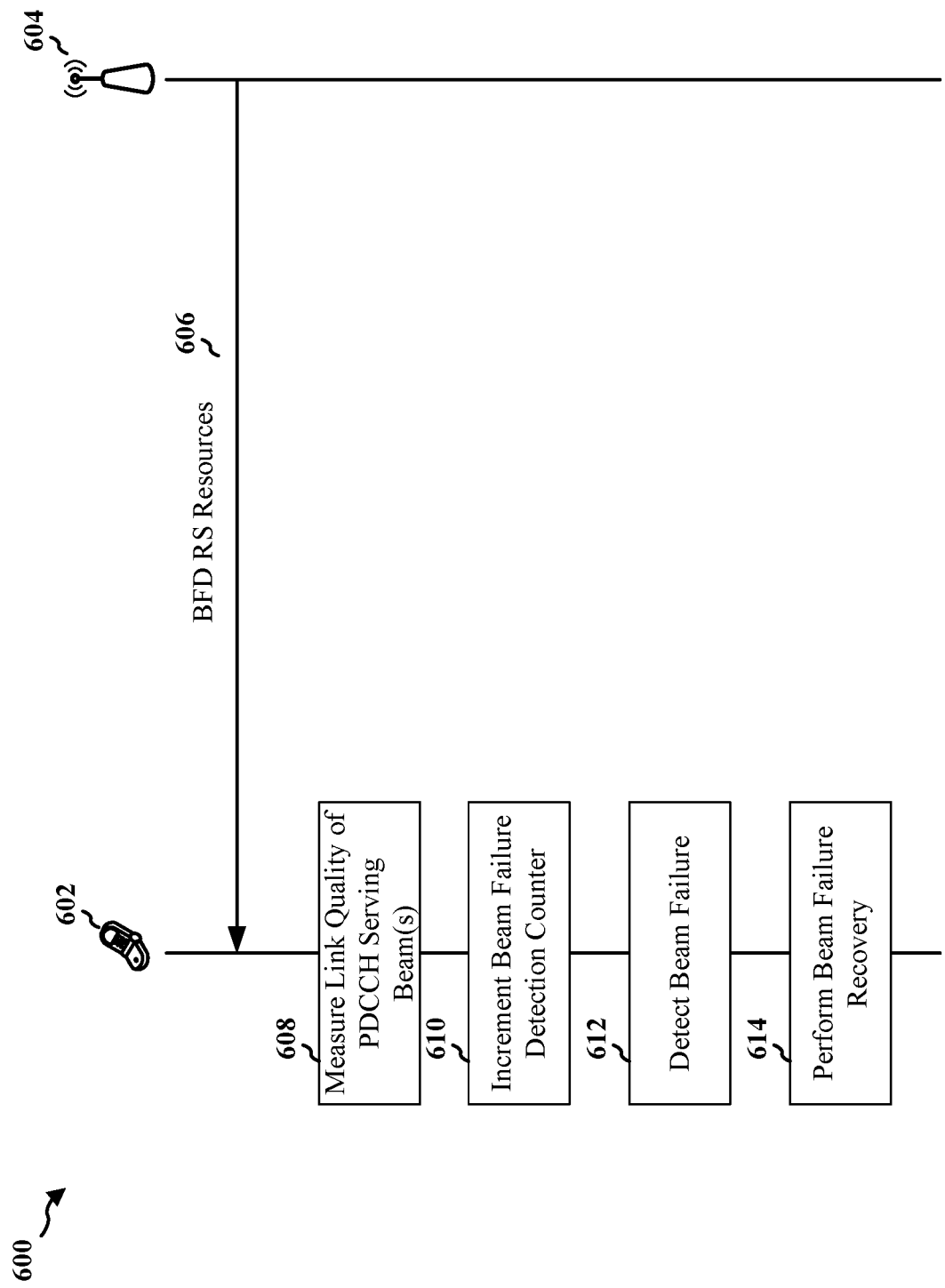
FIG. 6 is a call flow diagram between a UE and a TRP of a base station illustrating an example of a beam failure detection procedure.

FIG. 6 illustrates an example 600 of a BFD procedure performed by a UE 602 in communication with a TRP 604 of a base station. TRP 604 may correspond, for example, to TRP 404 of FIG. 4. In operation, TRP 604 provides to UE 602 one or more BFD reference-signal (RS) resources 606 over one or more PDCCH serving beams. In some aspects, only one PDCCH serving beam is implemented; in other aspects, TRP 604 may be configured with a second, wider PDCCH beam to allow for communication between the TRP 604 and UE 602 if the first PDCCH serving beam fails. For example, TRP 604 may configure up to two BFD RS resources respectively associated with each of the one or more PDCCH serving beams, and provide those RS resources to UE 602. In one aspect, the BFD RS resources 606 may comprise periodic CSI-RS resource configuration indexes configured by TRP 604 and transmitted to the UE 602 (e.g. in a higher layer parameter failureDetectionResources or some other name).

Using the BFD RS resources, at block 608, the UE can periodically measure a link quality of the PDCCH serving beam(s) to detect whether beam failure occurs. Alternatively, if TRP 604 does not provide BFD RS resources 606 for the UE to measure for link quality, the UE may instead measure CSI-RS resources periodically communicated over the one or more PDCCH serving beams which have a quasi-colocation (QCI) relationship with a beam the UE may use to monitor PDCCH. Based on the BFD RS resources 606 (or periodic CSI-RS resources), the physical (PHY) layer of the UE measures the link quality of the beams by identifying a reference signal received power (RSRP) of the RS resources and determining whether they are below a RSRP threshold preconfigured by TRP 604.

If the link quality is determined to be below the threshold, the PHY layer of the UE sends a beam failure indication (or BFD indication) to an upper layer (e.g. the medium access control (MAC) layer) of the UE 602. The MAC layer maintains a dynamic BFD counter, which the UE increments by one (at block 610) whenever a BFD indication is received from the PHY layer. The MAC layer also maintains a timer, which resets the BFD counter to zero whenever a BFD indication is not received after a pre-configured time. When the counter reaches a preconfigured maximum value, the UE detects beam failure 612 of the PDCCH serving beam(s) associated with the BFD RS resources 606. The UE 602 may then perform beam failure recovery at block 614 based on a set of candidate beams from which the UE can select a new beam, the details of which are described immediately below.

Figure 7:
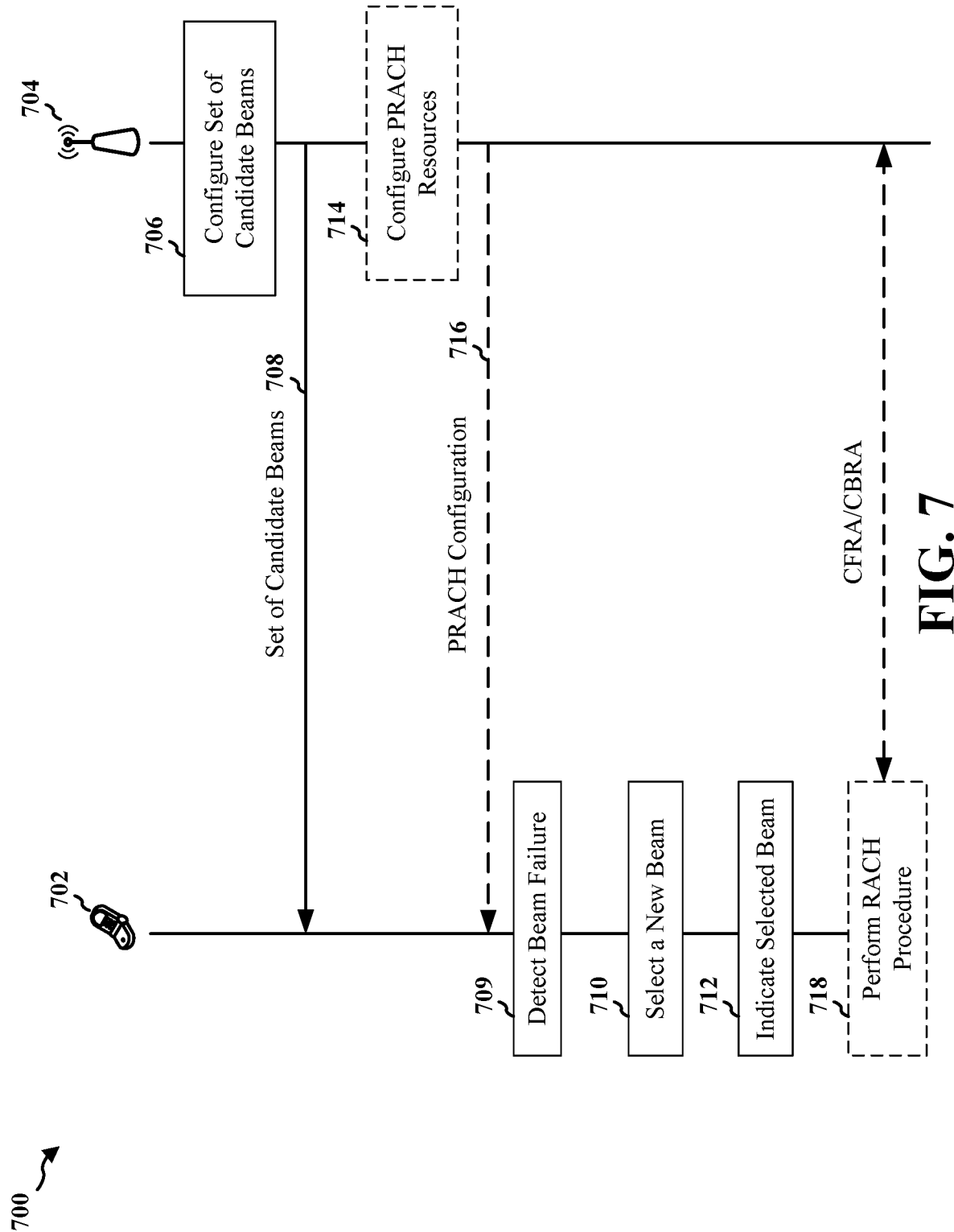
FIG. 7 is a call flow diagram between a UE and a TRP of a base station illustrating an example of a beam failure recovery procedure.

FIG. 7 illustrates an example 700 of a beam failure recovery procedure (occurring after the beam failure detection procedure of FIG. 6) which a UE 702 performs to recover its PDCCH serving beams. Initially prior to beam failure, a base station comprising TRP 704 configures a set of candidate beams at block 706 which the UE 702 may use to recover a PDCCH serving beam. The TRP 704 may correspond to TRP 604 of FIG. 6. The set of candidate beams may be a subset of a total set of beams transmitted by TRP 704. For example, the set of candidate beams may include a number of adjacent beams directed towards the location of the UE (e.g. where beam failure had occurred), with each beam having an identical beamwidth to the failed beam and/or a wider beamwidth than the failed beam. In one aspect, the set of candidate beams may comprise periodic CSI-RS resource configuration indexes and/or SS/PBCH block indexes configured for the TRP 704 and which are transmitted to the UE 702 (e.g. in a higher layer parameter candidateBeamRSList or some other name). After the candidate beams are configured, the TRP 704 provides the set of candidate beams 708 to the UE 702.

At block 709, the UE 702 may detect failure of a PDCCH serving beam as described above with respect to FIG. 6. For example, the UE 702 may detect that the PDCCH serving beam for TRP 704 has failed. Accordingly, the UE selects at block 710 a new beam from the set of candidate beams 708 to recover the PDCCH serving beam. The beam selection is based on link quality. For example, the UE 702 may measure the RSRP for each beam in the set of candidate beams (for example, based on CSI-RS associated with each beam), and select a new beam having a RSRP over a pre-configured threshold. If the serving cell in which beam failure is detected is a secondary cell (e.g. TRP 704 is in a secondary cell), the UE may indicate its preferred new beam to a base station in a primary cell at block 712. For example, the UE 702 may send a medium access control (MAC) control element (CE) to a base station in the primary cell to reconfigure the new PDCCH beam for TRP 704. The MAC CE may include the index of the secondary cell in which beam failure was detected, and the index of the UE's selected beam from the set of candidate beams.

The TRP 704 may also configure, at block 714, physical random access channel (PRACH) resources for beam failure recovery and provide the PRACH configuration 716 to the UE. For example, the PRACH configuration may include a unique preamble configured for the UE 702 to use when performing a contention-free random access (CFRA) procedure to reacquire a connection with TRP 704 in the event of beam failure. Alternatively, the TRP 704 may not configure any PRACH resources for beam failure recovery, and the UE may perform a contention-based random access (CBRA) procedure to reacquire the connection with TRP 704 in the event of beam failure. If the serving cell in which beam failure occurs is a primary cell or a special cell, the UE may perform a CFRA or CBRA RACH procedure 718 to indicate its preferred new beam for the PDCCH to TRP 704. In either CFRA or CBRA, each PRACH occasion may be associated with a respective beam in the set of candidate beams, and the PRACH configuration 716 may indicate the transmission occasions associated with each beam to the UE 702.

Thus, in one aspect, if the UE 702 is configured with dedicated PRACH resources and identifies a new beam from the set of candidate beams with sufficient link quality (e.g. having a RSRP over a pre-configured threshold), the UE may perform CFRA with TRP 704 by initially transmitting a preamble in the PRACH occasion corresponding to the identified beam. For example, if the set of candidate beams is comprised of three beams, and beam two is of sufficient link quality, the UE may select beam two and transmit the preamble in the second transmission occasion (e.g. associated with beam two) within a PRACH configuration period. Upon completion of the RACH procedure, the TRP 704 may subsequently reconfigure its PDCCH serving beam to correspond to the UE's selected beam two.

Alternatively, if the UE 702 is unable to select a new beam from the set of candidate beams (none of the candidate beams have sufficient link quality or RSRP exceeding the preconfigured threshold), or the base station comprising TRP 704 does not configure dedicated PRACH resources to the UE for beam failure recovery, the UE may perform CBRA with TRP 704 over common PRACH resources. In this aspect, the UE may select a beam among a total set of beams transmitted by TRP 704, e.g., based on synchronization signal blocks (SSBs) transmitted in the serving cell, and the UE may transmit a preamble in the PRACH transmission occasion corresponding to the identified beam. For example, the UE may select beam three based on a SSB received from TRP 704 and transmit a preamble in the third transmission occasion (e.g. associated with beam three) within a PRACH configuration period. Upon completion of the RACH procedure, the TRP 704 may subsequently reconfigure its PDCCH serving beam to correspond to the UE's selected beam three.

Thus, when detecting beam failure and performing beam failure recovery in Mode 1 multi-TRP operation, the UE has to track the serving beam(s) of only one PDCCH in a serving cell. However, in Mode 2 multi-TRP operation, the UE generally has to track the serving beam(s) of two PDCCH in a serving cell (e.g. one from each TRP) for beam failure detection and recovery. For example, one or more base stations may configure dedicated BFR PRACH resources and candidate beam sets for both TRPs, and the UE has to perform beam failure detection independently for each TRP based on beam failure reference signals associated with each TRP. Moreover, if strong candidate beams with sufficient link quality are unavailable and the serving cell is a primary or special cell, the UE may be required to perform CBRA for each TRP to recover the PDCCH serving beam for each TRP. This process not only requires additional resources compared to Mode 1 multi-TRP operation, but a longer delay in beam failure recovery time may be incurred. Hence, it would be helpful to enhance Mode 2 multi-TRP operation.

Aspects of the present disclosure enhance Mode 2 multi-TRP operation by allowing a UE to recover and reconfigure a failed PDCCH beam of a first TRP in a serving cell by using a second TRP which still has a working PDCCH in the same serving cell. For example, if the first TRP undergoes beam failure but the second TRP in the same cell has an operational beam, then rather than performing RACH on the first TRP, the UE may transmit a beam failure indication (e.g. a MAC CE) indicating a new beam for the PDCCH of the first TRP. The base station comprising the second TRP may then reconfigure the PDCCH serving beams of the first TRP based on the beam failure indication.

However, if the second TRP also undergoes beam failure while beam failure recovery is being performed for the first TRP, and the serving cell is a primary cell or a special cell, the UE only performs RACH on the primary TRP rather than both the primary TRP and secondary TRP. For instance, the UE may perform CFRA with the primary TRP to indicate a new beam if one or more candidate beams have sufficient link quality. Alternatively, the UE may perform CBRA with the primary TRP to indicate a new beam if no candidate beams have sufficient link quality. After the UE performs beam failure recovery using RACH on the primary TRP, the UE may perform beam failure recovery for the second TRP by transmitting a beam failure indication (e.g. a MAC CE). The base station comprising the primary TRP may then reconfigure the PDCCH serving beams of the secondary TRP based on the beam failure indication. Alternatively, if the serving cell is a secondary cell, the UE may simply transmit a beam failure indication (e.g. a MAC CE) in another secondary cell to reconfigure the failed PDCCH serving beam. The beam failure indication may include the index of the SCell where beam failure has occurred and the index of a selected candidate beam by the UE. As a result, the reliability of a serving cell may be increased.

Figure 8:
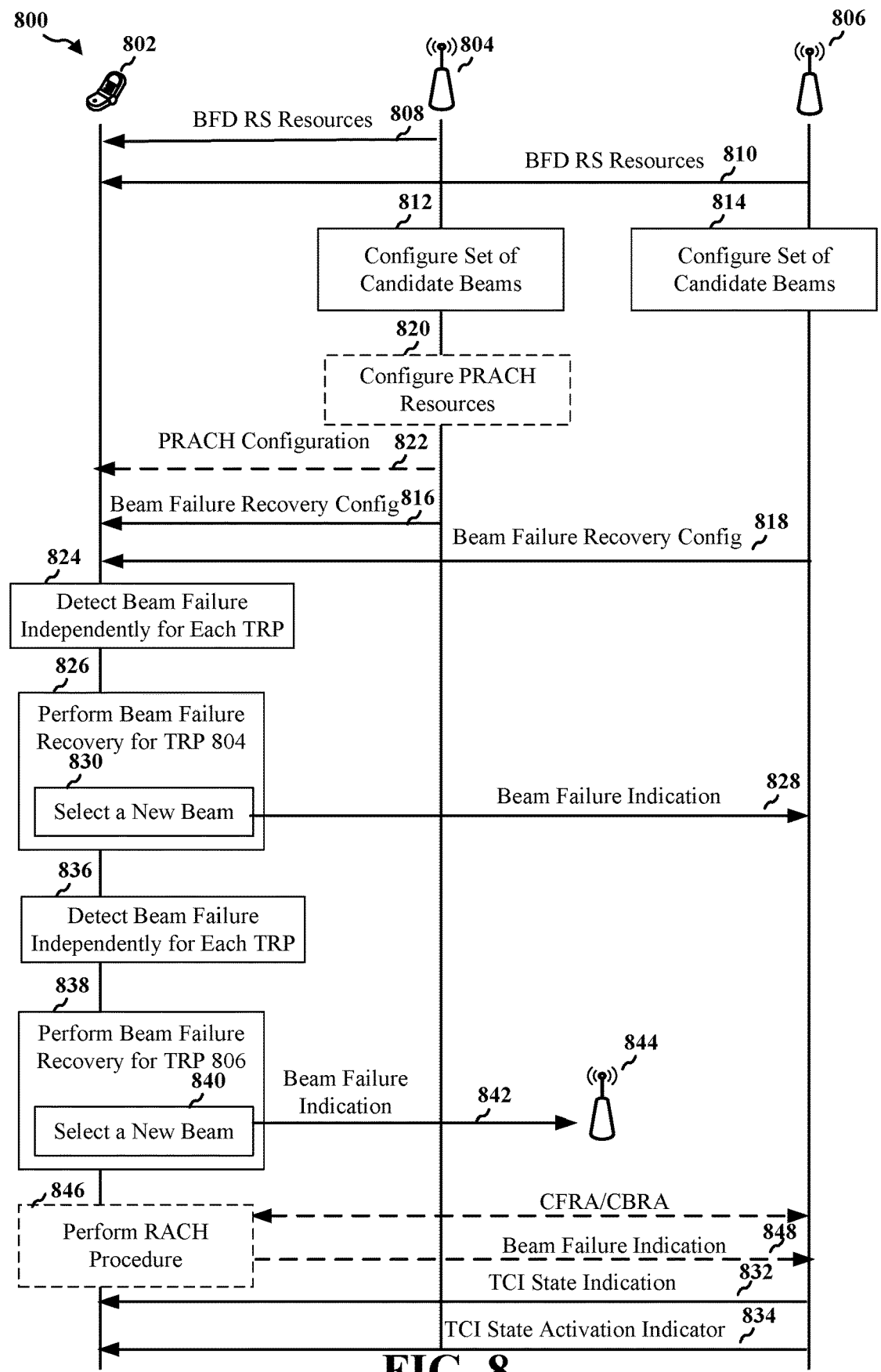
FIG. 8 is a call flow diagram between a UE and TRPs illustrating an example of a beam failure detection and recovery procedure in Mode 2 multi-TRP operation.

FIG. 8 illustrates an example 800 of a beam failure detection and recovery procedure performed by a UE 802 in communication with a TRP 804 and TRP 806 in Mode 2 multi-TRP operation. TRP 804 may correspond, for example, to TRP 504 of FIG. 5, and TRP 806 may correspond, for example, to TRP 506 of FIG. 5 within the same serving cell. One or more base stations comprising TRP 804 and/or TRP 806 may configure the TRP 804 to transmit one set of BFD RS resources 808 and TRP 806 to transmit another set of BFD RS resources 810. TRP 804 and 806 may provide UE 802 the RS resources 808, 810 over different PDCCH serving beams (e.g. PDCCH serving beams 516 and 518). In one aspect, the BFD RS resources 808, 810 may comprise periodic CSI-RS resource configuration indexes configured by TRP 804, 806 and transmitted to the UE 802 (e.g. in higher layer parameters failureDetectionResources or some other name).

The one or more base stations comprising TRP 804 and/or TRP 806 may also configure each TRP with a set of candidate beams 812, 814 which the UE 802 may respectively use to recover the PDCCH serving beam of each TRP 804, 806. TRP 804 and TRP 806 may each provide a beam failure recovery configuration 816, 818 to the UE 802 including their respective sets of candidate beams. Each set of candidate beams may be a subset of the total set of beams transmitted by the respective TRP 804, 806. In one aspect, each set of candidate beams may comprise periodic CSI-RS resource configuration indexes and/or SS/PBCH block indexes (e.g. in a higher layer parameter candidate-BeamRSList or some other name).

TRPs 804, 806 may also provide a BFD PRACH configuration to the UE 802. For example, assuming TRP 804 is the primary TRP, the base station comprising TRP 804 may configure PRACH resources 820 for the UE 802 to use for beam failure recovery of the PDCCH for TRP 804. For example, the PRACH resources may include a unique preamble configured for the UE 802 to use when performing a CFRA procedure to reacquire a connection with TRP 804. Alternatively, the TRP 804 may not configure any PRACH resources for beam failure recovery, and the UE may instead perform a CBRA procedure to reacquire the connection with TRP 804 in the event of beam failure of the primary TRP. In either type of procedure, the PRACH configuration 822 transmitted to the UE may include RACH transmission occasions associated with each beam in the set of candidate beams. Additionally, the primary TRP may provide the PRACH configuration 822 to the UE in the beam failure recovery configuration 816 (along with the set of candidate beams), rather than in a separate message as illustrated for example in FIG. 8.

At block 824, the UE 802 detects beam failure for each TRP 804, 806 independently. For example, using the BFD RS resources 808, 810 from each TRP 804, 806, the UE may periodically measure a link quality of the PDCCH serving beam(s) from each TRP to detect whether beam failure occurs at each TRP. Based on the BFD RS resources, the UE may determine whether an RSRP associated with each beam is below a RSRP threshold preconfigured by the one or more base stations comprising TRP 804, 806. If the link quality of a beam is below the threshold, the UE increments a dynamic BFD counter associated with the TRP transmitting the beam. When the counter reaches a preconfigured maximum value for a particular TRP, the UE detects beam failure of the PDCCH serving beam(s) from that TRP.

In this example, at block 824, a beam failure may be detected for TRP 804 while the PDCCH serving beam of TRP 806 (in the same serving cell) is operational. Accordingly, in response to the beam failure detection, the UE 802 may perform beam failure recovery 826 to recover the PDCCH serving beam for the TRP 804 by transmitting a beam failure indication 828. The beam failure indication 828 may be a MAC CE indicating a new beam which the UE 802 has selected based on link quality from the set of candidate beams received from TRP 804. For example, when performing beam failure recovery 826 for the PDCCH of TRP 804, the UE 802 may select at block 830 a new beam from TRP 804's set of candidate beams and transmit the beam failure indication 828. For instance, the UE 802 may measure the RSRP of each beam in the set of candidate beams, identify a new beam having a RSRP over a pre-configured threshold, and subsequently transmit the index of that selected beam in the MAC CE.

The base station comprising TRP 806 may receive the beam failure indication 828 and then reconfigure the PDCCH as well as the PDSCH beam for TRP 804 using the PDCCH and PSDCH of TRP 806. For example, TRP 806 may send to the UE 802 a transmission configuration indicator (TCI) state indication 832 for a UE-specific PDCCH MAC CE and a TCI state activation indicator 834 (activation/deactivation) for a UE-specific PDSCH MAC CE. Based on the TCI state indicator 832 and/or TCI state activation indicator 834, the UE may communicate with TRP 804 using the new beam.

In certain aspects, another beam failure may be detected for TRP 806 at block 836 while the UE is still performing beam failure recovery 826 for the PDCCH of TRP 804. In such case, the UE 802 may perform another beam failure recovery 838 to recover the PDCCH of TRP 806 at the same time as it performs beam failure recovery 826 to recover the PDCCH of TRP 804. In one example, the serving cell in which beam failures are detected at blocks 824 and 836 may be a secondary cell. In such case, when performing beam failure recovery 838 for the PDCCH of TRP 806, the UE 802 may select a new beam at block 840 from the set of candidate beams for TRP 806 and transmit a beam failure indication 842 (e.g. a MAC CE) in another secondary cell (e.g. including a third TRP 844 whose PDCCH beam is currently in operation). The MAC CE may include the index of the secondary cell in which beam failure was detected, and the index of the UE's selected beam from the set of candidate beams. The base station comprising TRP 844 may receive the beam failure indication 842 and then reconfigure the PDCCH as well as the PDSCH beam for TRP 806 (or TRP 804) using the PDCCH and PSDCH of TRP 806 as described above.

In another example, the serving cell in which beam failures are detected at blocks 824 and 836 may be a primary cell or a special cell. In such case, the UE 802 may perform beam recovery for the PDCCH of the primary TRP as described above with respect to FIG. 7. For example, if TRP 806 is the primary TRP, the UE may perform a CFRA or CBRA RACH procedure 846 with TRP 806 based on the beam failure recovery configuration 818 (or PRACH resources). In either procedure, the UE may transmit a preamble in the PRACH transmission occasion corresponding to the identified beam to indicate its preferred new beam for the PDCCH of the primary TRP. After successfully completing beam failure recovery on the primary TRP (e.g. TRP 806), the UE may then transmit a beam failure indication 848 (e.g. a MAC CE) for the primary TRP to reconfigure the PDCCH beam for the secondary TRP (e.g. TRP 804) using the PDCCH and PSDCH of TRP 806 as described above.

Figure 9:
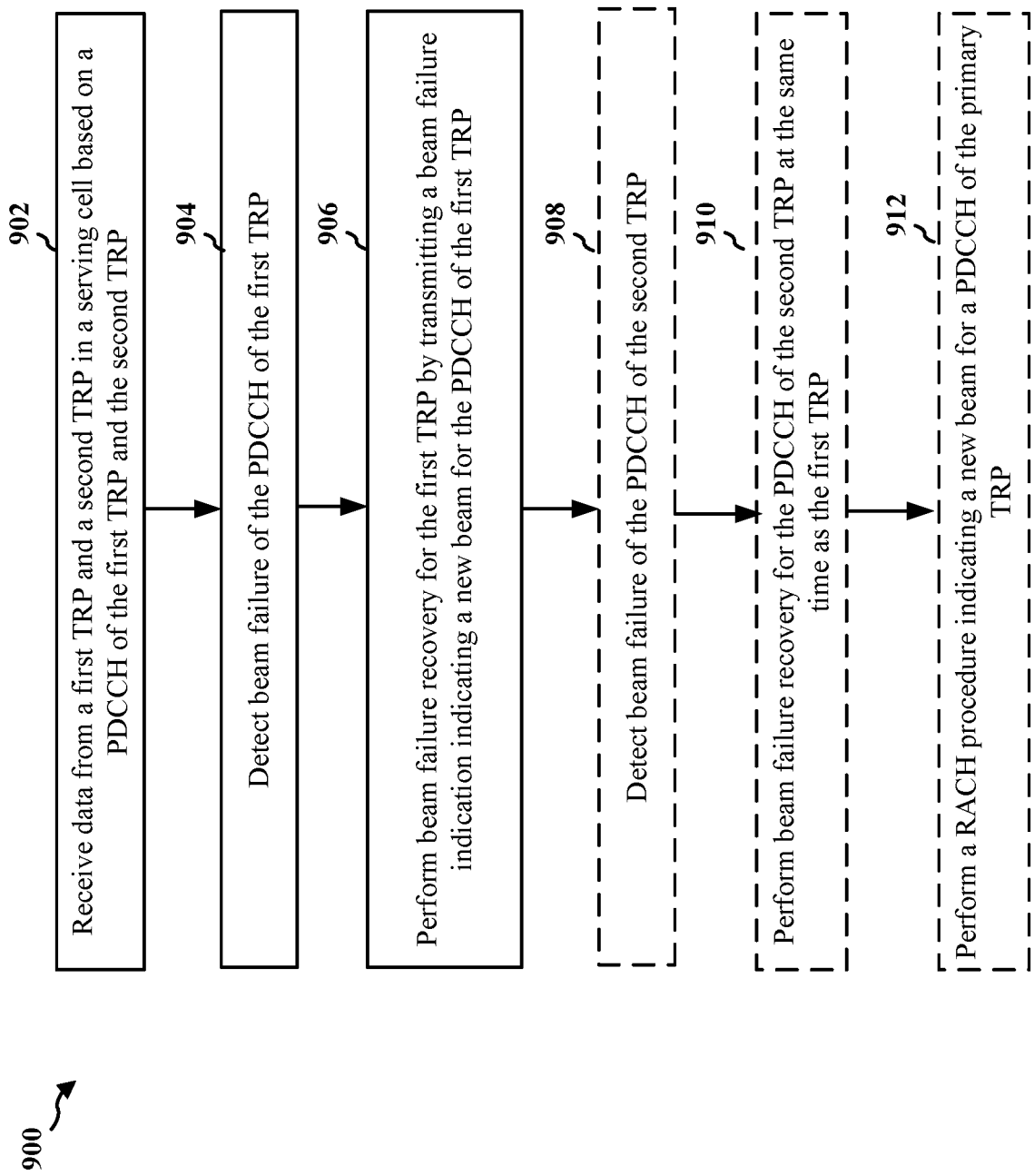
FIG. 9 is a flowchart of a method of wireless communication.

FIG. 9 is a flowchart 900 of a method of wireless communication. The method may be performed by a UE (e.g., the UE 104, 350, 402, 502, 602, 702, 802; the apparatus 1002/1002'; the processing system 1114, which may include the memory 360 and which may be the entire UE 350 or a component of the UE 350, such as the TX processor 368, the RX processor 356, and/or the controller/processor 359). Optional aspects are illustrated in dashed lines.

At 902, the UE receives data from a first transmission reception point (TRP) and a second TRP in a serving cell based on a physical downlink control channel (PDCCH) of the first TRP and the second TRP, the PDCCH of the first TRP and second TRP each received over separate beams. For example, 902 may be performed by PDCCH component 1006 in FIG. 10. For instance, referring to FIG. 5, a serving cell 501 may include multiple TRPs in communication with a UE 502 (e.g. TRP 1 504 and TRP 2 506). Each TRP may communicate with the UE 502 using one or more beams. For example, TRP 1 504 may transmit PDCCH 508 to UE 502 using a PDCCH serving beam 516, while TRP 2 506 may transmit PDCCH 510 to UE 502 using another PDCCH serving beam 518.

At 904, the UE detects beam failure of the PDCCH of the first TRP. For example, 904 may be performed by detection component 1008 in FIG. 10. The beam failure may be detected based on one or more reference signals received from the first TRP and the second TRP. The beam failure is detected for the first TRP independently from the second TRP. For example, referring to FIG. 8, one or more base stations comprising TRP 804 and/or TRP 806 may configure the TRP 804 to transmit one set of BFD RS resources 808 and TRP 806 to transmit another set of BFD RS resources 810. At block 824, the UE 802 detects beam failure for each TRP 804, 806 independently. For example, using the BFD RS resources 808, 810 from each TRP 804, 806, the UE may periodically measure a link quality of the PDCCH serving beam(s) from each TRP to detect whether beam failure occurs at each TRP. Based on the BFD RS resources, the UE may determine whether an RSRP associated with each beam is below a RSRP threshold preconfigured by the one or more base stations comprising TRP 804, 806. If the link quality of a beam is below the threshold, the UE increments a dynamic BFD counter associated with the TRP transmitting the beam. When the counter reaches a preconfigured maximum value for a particular TRP, the UE detects beam failure of the PDCCH serving beam(s) from that TRP.

At 906, the UE performs beam failure recovery for the first TRP by transmitting a beam failure indication indicating a new beam for the PDCCH of the first TRP. For example, 906 may be performed by recovery component 1010 in FIG. 10. The beam failure recovery may be performed based on a beam failure recovery configuration comprising a set of candidate beams for the first TRP and the second TRP. In one aspect, beam failure recovery may be performed for the PDCCH of the first TRP while the beam for the PDCCH of the second TRP is operational. In this aspect, the beam failure indication comprises a medium access control (MAC) control element (CE) indicating a new beam for the PDCCH of the first TRP. For example, referring to FIG. 8, the one or more base stations comprising TRP 804 and/or TRP 806 may configure each TRP with a set of candidate beams 812, 814 which the UE 802 may respectively use to recover the PDCCH serving beam of each TRP 804, 806. TRP 804 and TRP 806 may each provide a beam failure recovery configuration 816, 818 to the UE 802 including their respective sets of candidate beams. In this example, at block 824, a beam failure may be detected for TRP 804 while the PDCCH serving beam of TRP 806 (in the same serving cell) is operational. Accordingly, in response to the beam failure detection, the UE 802 may perform beam failure recovery 826 to recover the PDCCH serving beam for the TRP 804 by transmitting a beam failure indication 828. The beam failure indication 828 may be a MAC CE indicating a new beam which the UE 802 has selected based on link quality from the set of candidate beams received from TRP 804.

Beam failure recovery may be performed for the PDCCH of the first TRP based on a transmission configuration indicator (TCI) state indication for a UE-specific PDCCH MAC CE received from the second TRP. Beam failure recovery may be further performed for a physical downlink shared channel (PDSCH) of the first TRP based on a transmission configuration indicator (TCI) state activation indication for a UE-specific PDSCH MAC CE received from the second TRP. For example, referring to FIG. 8, the base station comprising TRP 806 may receive the beam failure indication 828 and then reconfigure the PDCCH as well as the PDSCH beam for TRP 804 using the PDCCH and PSDCH of TRP 806. For example, TRP 806 may send to the UE 802 a transmission configuration indicator (TCI) state indication 832 for a UE-specific PDCCH MAC CE and a TCI state activation indicator 834 (activation/deactivation) for a UE-specific PDSCH MAC CE. Based on the TCI state indicator 832 and/or TCI state activation indicator 834, the UE may communicate with TRP 804 using the new beam.

In another aspect, at 908, the UE may detect beam failure of the PDCCH of the second TRP. For example, 908 may be performed by detection component 1008 in FIG. 10. For example, referring to FIG. 8, another beam failure may be detected as described above, but for TRP 806 at block 836 while the UE is still performing beam failure recovery 826 for the PDCCH of TRP 804.

Accordingly, at 910, the UE may perform beam failure recovery for the PDCCH of the second TRP at the same time as the first TRP. For example, 910 may be performed by recovery component 1010 in FIG. 10. In one aspect, the serving cell comprises a secondary cell, and the beam failure recovery is performed for the PDCCH of the second TRP by transmitting a beam failure indication in a different secondary cell. The beam failure indication comprises a medium access control (MAC) control element (CE) indicating a new beam for the PDCCH of the second TRP. For example, referring to FIG. 8, the UE 802 may perform another beam failure recovery 838 to recover the PDCCH of TRP 806 at the same time as it performs beam failure recovery 826 to recover the PDCCH of TRP 804. In one example, the serving cell in which beam failures are detected at blocks 824 and 836 may be a secondary cell. In such case, when performing beam failure recovery 838 for the PDCCH of TRP 806, the UE 802 may select a new beam at block 840 from the set of candidate beams for TRP 806 and transmit a beam failure indication 842 (e.g. a MAC CE) in another secondary cell (e.g. including a third TRP 844 whose PDCCH beam is currently in operation). The MAC CE may include the index of the secondary cell in which beam failure was detected, and the index of the UE's selected beam from the set of candidate beams. The base station comprising TRP 844 may receive the beam failure indication 842 and then reconfigure the PDCCH as well as the PDSCH beam for TRP 806 (or TRP 804) using the PDCCH and PSDCH of TRP 806 as described above.

In another aspect, the serving cell comprises a special cell, and the special cell comprises one of a primary cell or a primary secondary cell group cell. In this aspect, at 912, the UE may perform a random access channel (RACH) procedure indicating a new beam for a PDCCH of the primary TRP. For example, 912 may be performed by RACH component 1014 in FIG. 10. A physical RACH (PRACH) preamble is transmitted in a PRACH occasion associated with the new beam during the RACH procedure. The first TRP may comprise a primary TRP, and the second TRP may comprise a secondary TRP. For example, referring to FIG. 8, the serving cell in which beam failures are detected at blocks 824 and 836 may be a primary cell or a special cell. In such case, the UE 802 may perform beam recovery for the PDCCH of the primary TRP as described above with respect to FIG. 7. For example, if TRP 806 is the primary TRP, the UE may perform a CFRA or CBRA RACH procedure 846 with TRP 806 based on the beam failure recovery configuration 818 (or PRACH resources). In either procedure, the UE may transmit a preamble in the PRACH transmission occasion corresponding to the identified beam to indicate its preferred new beam for the PDCCH of the primary TRP.

Figure 10:
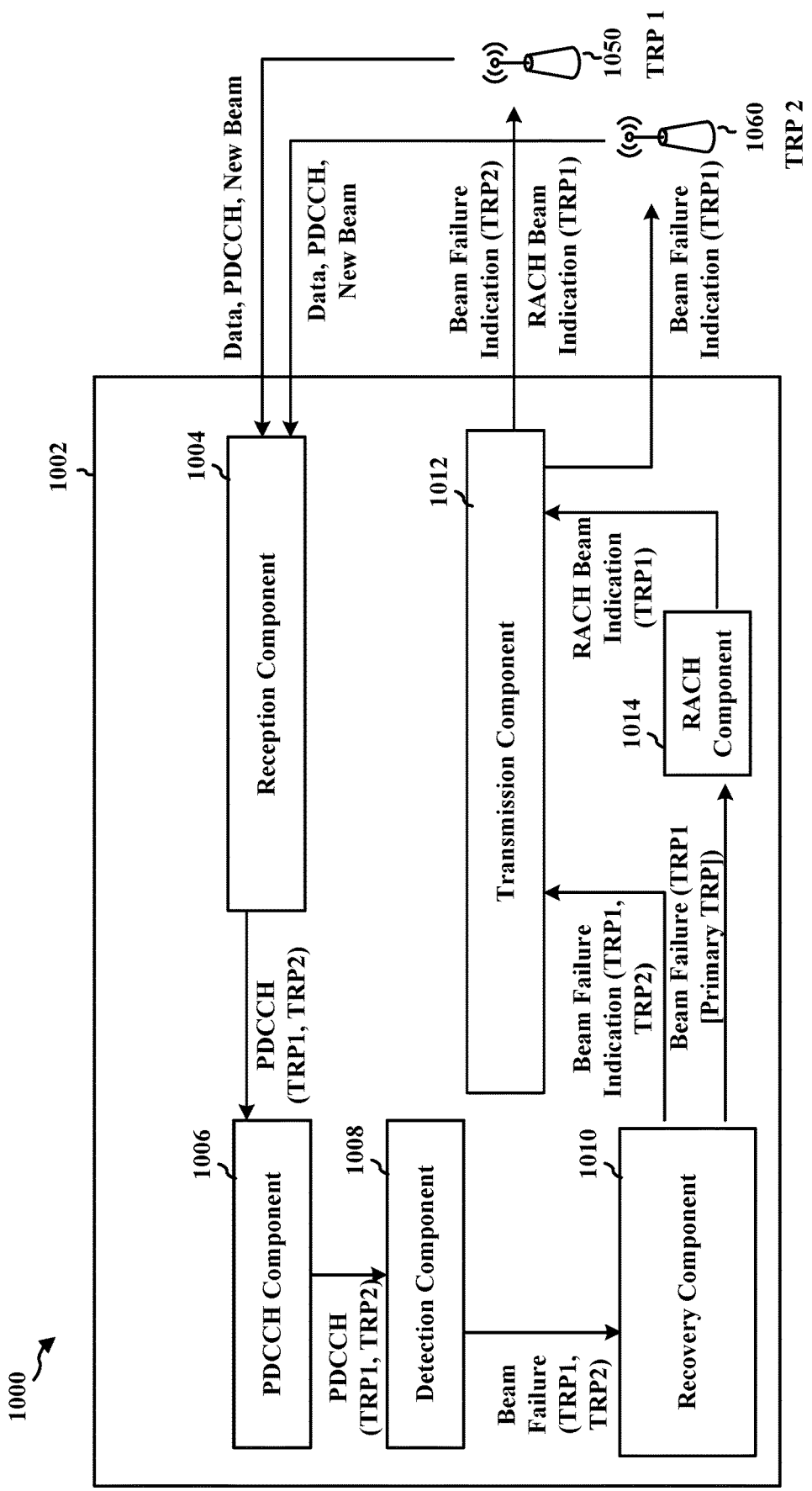
FIG. 10 is a conceptual data flow diagram illustrating the data flow between different means/components in an example UE apparatus.

FIG. 10 is a conceptual data flow diagram 1000 illustrating the data flow between different means/components in an example apparatus 1002. The apparatus may be a UE (e.g. the UE 104, 350, 402, 502, 602, 702, 802) in communication with one or more base stations 1050, 1060 (e.g. base station 102/180, 310) comprising one or more TRPs (e.g. TRP 404, 406, 504, 506, 604, 704, 804, 806). The apparatus includes a reception component 1004 that is configured to receive downlink communications from one or more TRPs. The apparatus includes a PDCCH component 1006 that is configured to receive data from a first transmission reception point (TRP) and a second TRP in a serving cell based on a physical downlink control channel (PDCCH) of the first TRP and the second TRP, the PDCCH of the first TRP and second TRP each received over separate beams, e.g., as described in connection with 902 in FIG. 9. The apparatus includes a detection component 1008 that is configured to detecting beam failure of the PDCCH of the first TRP, e.g., as described in connection with 904 in FIG. 9. The detection component 1008 is also configured to detect beam failure of the PDCCH of the second TRP, e.g., as described in connection with 908 in FIG. 9. The apparatus includes a recovery component 1010 that is configured to perform beam failure recovery for the first TRP by transmitting a beam failure indication indicating a new beam for the PDCCH of the first TRP, e.g., as described in connection with 906 in FIG. 9. The recovery component 1010 is also configured to perform beam failure recovery for the PDCCH of the second TRP at the same time as the first TRP, e.g., as described in connection with 910 in FIG. 9. The apparatus includes a transmission component 1012 that is configured to transmit uplink communications to the one or more base stations. The apparatus includes a RACH component 1014 that is configured to perform a random access channel (RACH) procedure indicating a new beam for a PDCCH of the primary TRP, e.g., as described in connection with 912 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
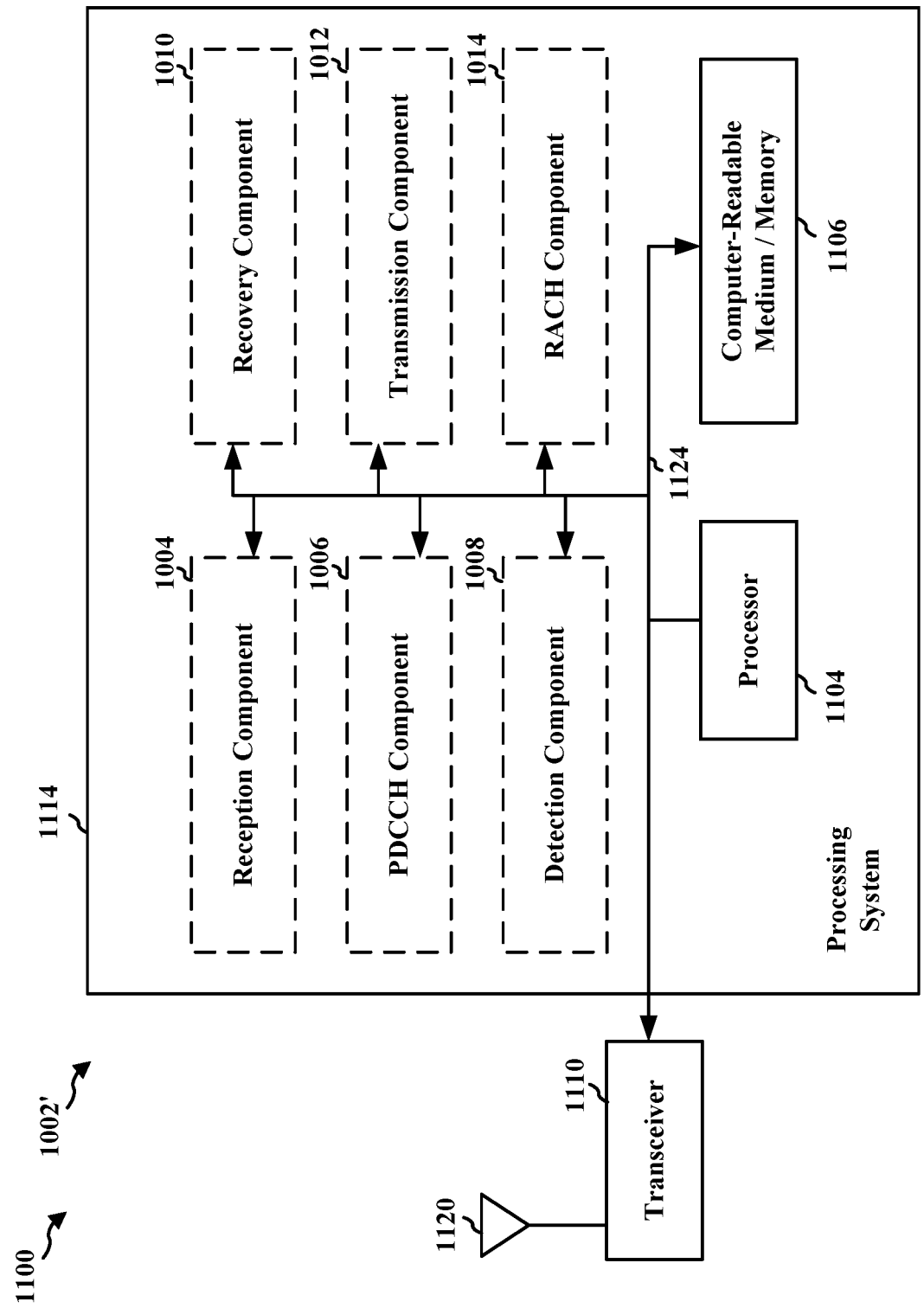
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving data from a first transmission reception point (TRP) and a second TRP in a serving cell based on a physical downlink control channel (PDCCH) of the first TRP and the second TRP, the PDCCH of the first TRP and second TRP each received over separate beams; means for detecting beam failure of the PDCCH of the first TRP; and means for performing beam failure recovery for the first TRP by transmitting a beam failure indication indicating a new beam for the PDCCH of the first TRP. In one configuration, the means for detecting may be further configured to detect beam failure of the PDCCH of the second TRP. In one configuration, the means for performing may be further configured to perform beam failure recovery for the PDCCH of the second TRP at the same time as the first TRP. In one configuration, the apparatus may also include means for performing a random access channel (RACH) procedure indicating a new beam for a PDCCH of the primary TRP.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
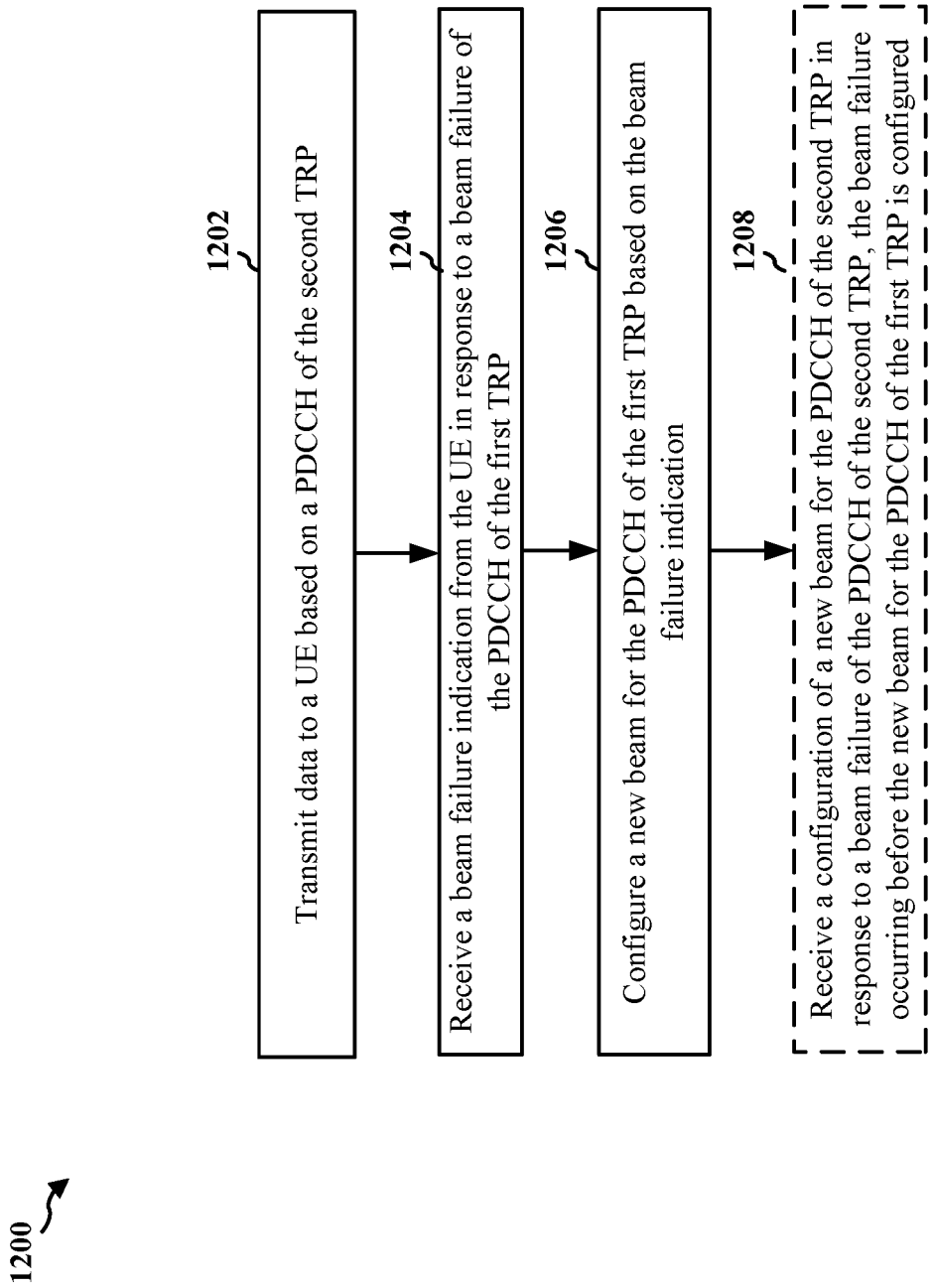
FIG. 12 is a flowchart of a method of wireless communication.

FIG. 12 is a flowchart 1200 of a method of wireless communication. The method may be performed by a base station (e.g., the base station 102/180, 310; the apparatus 1302/1302'; the processing system 1414, which may include the memory 376 and which may be the entire base station 310 or a component of the base station 310, such as the TX processor 316, the RX processor 370, and/or the controller/processor 375). The base station may communicate with a first TRP in a serving cell (e.g., the TRPs 404, 504, 804), and the base station may comprise a second TRP in the serving cell (e.g. the TRPs 406, 506, 806). The base station may alternatively comprise the first TRP and second TRP. Optional aspects are illustrated in dashed lines.

At 1202, the base station transmits data to a user equipment (UE) based on a physical downlink control channel (PDCCH) of the second TRP, wherein the PDCCH of the second TRP is transmitted to the UE over a separate beam than a PDCCH of the first TRP. For example, 1202 may be performed by beam component 1314 in FIG. 13. For instance, referring to FIG. 5, a serving cell 501 may include multiple TRPs in communication with a UE 502 (e.g. TRP 1 504 and TRP 2 506). Each TRP may communicate with the UE 502 using one or more beams. For example, TRP 1 504 may transmit PDCCH 508 to UE 502 using a PDCCH serving beam 516, while TRP 2 506 may transmit PDCCH 510 to UE 502 using another PDCCH serving beam 518.

At 1204, the base station receives a beam failure indication from the UE in response to a beam failure of the PDCCH of the first TRP. For example, 1204 may be performed by beam failure component 1306 in FIG. 13. The beam failure indication may be received based on one or more reference signals of the first TRP and the second TRP. The beam failure indication may comprise a medium access control (MAC) control element (CE) indicating a new beam for the PDCCH of the first TRP. In one aspect, the new beam is configured for the PDCCH of the first TRP while the beam for the PDCCH of the second TRP is operational. For example, referring to FIG. 8, one or more base stations comprising TRP 804 and/or TRP 806 may configure the TRP 804 to transmit one set of BFD RS resources 808 and TRP 806 to transmit another set of BFD RS resources 810. At block 824, the UE 802 detects beam failure for each TRP 804, 806 independently. For example, using the BFD RS resources 808, 810 from each TRP 804, 806, the UE may periodically measure a link quality of the PDCCH serving beam(s) from each TRP to detect whether beam failure occurs at each TRP. In this example, at block 824, a beam failure may be detected for TRP 804 while the PDCCH serving beam of TRP 806 (in the same serving cell) is operational. Accordingly, in response to the beam failure detection, the UE 802 may perform beam failure recovery 826 to recover the PDCCH serving beam for the TRP 804 by transmitting a beam failure indication 828. The beam failure indication 828 may be a MAC CE indicating a new beam which the UE 802 has selected based on link quality from the set of candidate beams received from TRP 804. The base station comprising TRP 806 may receive the beam failure indication 828.

At 1206, the base station configures a new beam for the PDCCH of the first TRP based on the beam failure indication. For example, 1206 may be performed by configuration component 1308 in FIG. 13. The new beam may be configured based on a beam failure recovery configuration comprising a set of candidate beams for the first TRP and the second TRP. The new beam may be configured for the PDCCH of the first TRP based on a transmission configuration indicator (TCI) state indication for a UE-specific PDCCH MAC CE transmitted from the second TRP. Another beam may also be configured for a physical downlink shared channel (PDSCH) of the first TRP based on a transmission configuration indicator (TCI) state activation indication for a UE-specific PDSCH MAC CE transmitted from the second TRP. For example, referring to FIG. 8, the one or more base stations comprising TRP 804 and/or TRP 806 may configure each TRP with a set of candidate beams 812, 814 which the UE 802 may respectively use to recover the PDCCH serving beam of each TRP 804, 806. TRP 804 and TRP 806 may each provide a beam failure recovery configuration 816, 818 to the UE 802 including their respective sets of candidate beams. The base station comprising TRP 806 may receive the beam failure indication 828 and then reconfigure the PDCCH as well as the PDSCH beam for TRP 804 using the PDCCH and PSDCH of TRP 806. For example, TRP 806 may send to the UE 802 a transmission configuration indicator (TCI) state indication 832 for a UE-specific PDCCH MAC CE and a TCI state activation indicator 834 (activation/deactivation) for a UE-specific PDSCH MAC CE. Based on the TCI state indicator 832 and/or TCI state activation indicator 834, the UE may communicate with TRP 804 using the new beam.

In another aspect, at 1208, the base station receives a configuration of a new beam for the PDCCH of the second TRP in response to a beam failure of the PDCCH of the second TRP, the beam failure occurring before the new beam for the PDCCH of the first TRP is configured. For example, 1208 may be performed by new beam component 1312 in FIG. 13. In one aspect, the serving cell comprises a secondary cell, and the configuration of the new beam is received from a third TRP in a different secondary cell. For example, referring to FIG. 8, another beam failure may be detected as described above, but for TRP 806 at block 836 while the UE is still performing beam failure recovery 826 for the PDCCH of TRP 804. In one example, the serving cell in which beam failures are detected at blocks 824 and 836 may be a secondary cell. In such case, when performing beam failure recovery 838 for the PDCCH of TRP 806, the UE 802 may select a new beam at block 840 from the set of candidate beams for TRP 806 and transmit a beam failure indication 842 (e.g. a MAC CE) in another secondary cell (e.g. including a third TRP 844 whose PDCCH beam is currently in operation). The MAC CE may include the index of the secondary cell in which beam failure was detected, and the index of the UE's selected beam from the set of candidate beams. The base station comprising TRP 844 may receive the beam failure indication 842 and then reconfigure the PDCCH as well as the PDSCH beam for TRP 806 (or TRP 804) using the PDCCH and PSDCH of TRP 806 as described above.

In another aspect, the serving cell comprises a special cell, and the special cell comprises one of a primary cell or a primary secondary cell group cell. In such case, the first TRP comprises a primary TRP, the second TRP comprises a secondary TRP, and the configuration of the new beam is received from the primary TRP.

Alternatively, the second TRP may comprise the primary TRP, and the configuration of the new beam is based on a physical random access channel (PRACH) preamble received in a PRACH occasion associated with the new beam. For example, referring to FIG. 8, the serving cell in which beam failures are detected at blocks 824 and 836 may be a primary cell or a special cell. In such case, the UE 802 may perform beam recovery for the PDCCH of the primary TRP as described above with respect to FIG. 7. For example, if TRP 806 is the primary TRP, the UE may perform a CFRA or CBRA RACH procedure 846 with TRP 806 based on the beam failure recovery configuration 818 (or PRACH resources). In either procedure, the UE may transmit a preamble in the PRACH transmission occasion corresponding to the identified beam to indicate its preferred new beam for the PDCCH of the primary TRP. After successfully completing beam failure recovery on the primary TRP (e.g. TRP 806), the UE may then transmit a beam failure indication 848 (e.g. a MAC CE) for the primary TRP to reconfigure the PDCCH beam for the secondary TRP (e.g. TRP 804) using the PDCCH and PDSCH of TRP 806 as described above.

Figure 13:
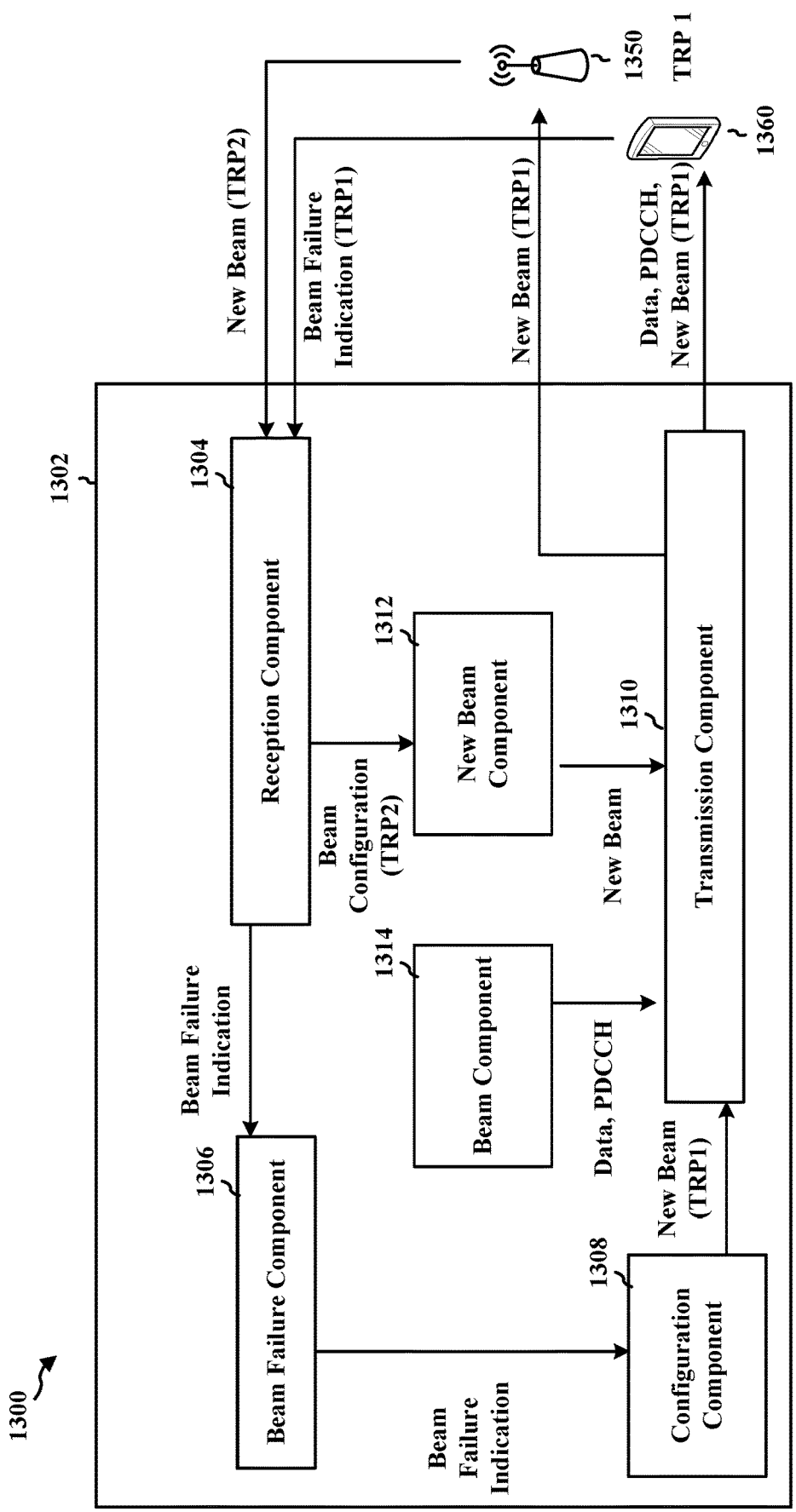
FIG. 13 is a conceptual data flow diagram illustrating the data flow between different means/components in an example base station apparatus.

FIG. 13 is a conceptual data flow diagram 1300 illustrating the data flow between different means/components in an example apparatus 1302. The apparatus may be a base station (e.g. base station 102/180, 310) which may communicate with a first TRP in a serving cell (e.g., the TRPs 404, 504, 804), and may comprise a second TRP in the serving cell (e.g. the TRPs 406, 506, 806). The base station may also comprise the first and second TRPs. The apparatus includes a reception component 1304 that is configured to receive uplink communications from a UE 1360 (e.g. UE 104, 350, 402, 502, 602, 702, 802) as well as communications from other base stations/TRPs 1350. The apparatus includes a transmission component 1310 that is configured to transmit downlink communications to the UE as well as communications to other base stations/TRPs. The apparatus includes a beam component 1314 that is configured to transmit data to a user equipment (UE) based on a physical downlink control channel (PDCCH) of the second TRP, where the PDCCH of the second TRP is transmitted to the UE over a separate beam than a PDCCH of the first TRP, e.g., as described in connection with 1202 of FIG. 12. The apparatus includes a beam failure component 1306 which is configured to receive a beam failure indication from the UE in response to a beam failure of the PDCCH of the first TRP, e.g., as described in connection with 1204 of FIG. 12. The apparatus includes a configuration component 1308 which configures a new beam for the PDCCH of the first TRP based on the beam failure indication, e.g., as described in connection with 1206 of FIG. 12. The apparatus includes a new beam component 1312 that receives a configuration of a new beam for the PDCCH of the second TRP in response to a beam failure of the PDCCH of the second TRP, the beam failure occurring before the new beam for the PDCCH of the first TRP is configured, e.g., as described in connection with 1208 of FIG. 12.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
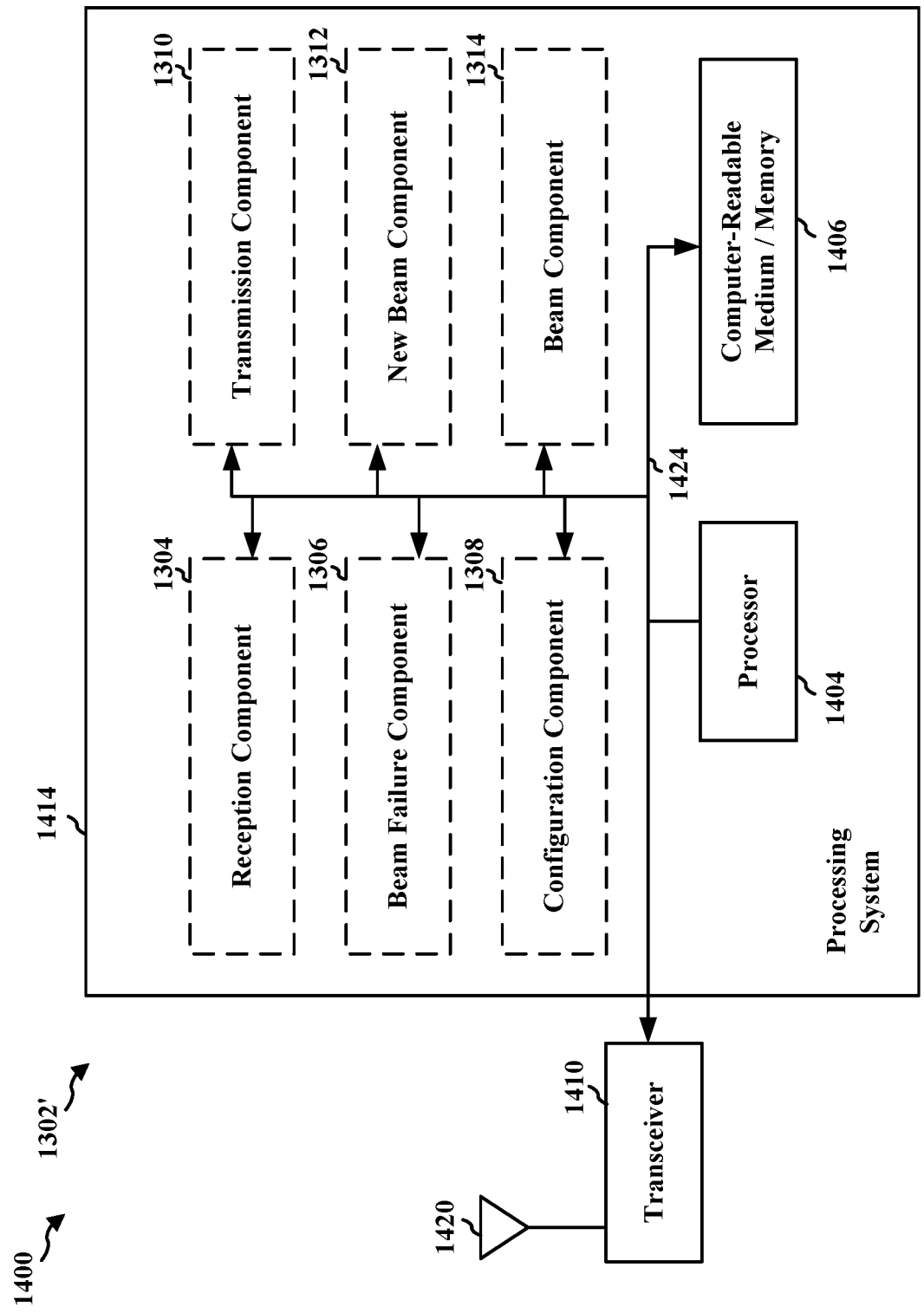
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for transmitting data to a user equipment (UE) based on a physical downlink control channel (PDCCH) of the second TRP, wherein the PDCCH of the second TRP is transmitted to the UE over a separate beam than a PDCCH of the first TRP; means for receiving a beam failure indication from the UE in response to a beam failure of the PDCCH of the first TRP; and means for configuring a new beam for the PDCCH of the first TRP based on the beam failure indication. In one configuration, the apparatus may also include means for receiving a configuration of a new beam for the PDCCH of the second TRP in response to a beam failure of the PDCCH of the second TRP, the beam failure occurring before the new beam for the PDCCH of the first TRP is configured.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a UE, comprising: receiving data from a first transmission reception point (TRP) and a second TRP in a serving cell based on a physical downlink control channel (PDCCH) of the first TRP and the second TRP, the PDCCH of the first TRP and second TRP each received over separate beams; detecting beam failure of the PDCCH of the first TRP; and performing beam failure recovery for the first TRP by transmitting a beam failure indication indicating a new beam for the PDCCH of the first TRP.

Example 2 is the method of Example 1, wherein the beam failure is detected based on one or more reference signals received from the first TRP and the second TRP.

Example 3 is the method of any of Examples 1 and 2, wherein the beam failure recovery is performed based on a beam failure recovery configuration comprising a set of candidate beams for the first TRP and the second TRP.

Example 4 is the method of any of Examples 1 to 3, wherein the beam failure is detected for the first TRP independently from the second TRP.

Example 5 is the method of any of Examples 1 to 4, wherein beam failure recovery is performed for the PDCCH of the first TRP while a beam for the PDCCH of the second TRP is operational.

Example 6 is the method of any of Examples 1 to 5, wherein the beam failure indication comprises a medium access control (MAC) control element (CE) indicating a new beam for the PDCCH of the first TRP, and wherein beam failure recovery is performed for the PDCCH of the first TRP based on a transmission configuration indicator (TCI)

state indication for a UE-specific PDCCH MAC CE received from the second TRP.

Example 7 is the method of any of Examples 1 to 6, wherein the beam failure indication comprises a medium access control (MAC) control element (CE) indicating a new beam for the PDCCH of the first TRP, and wherein beam failure recovery is further performed for a physical downlink shared channel (PDSCH) of the first TRP based on a transmission configuration indicator (TCI) state activation indication for a UE-specific PDSCH MAC CE received from the second TRP.

Example 8 is the method of any of Examples 1 to 7, further comprising: detecting beam failure of the PDCCH of the second TRP; and performing beam failure recovery for the PDCCH of the second TRP at the same time as the first TRP.

Example 9 is the method of any of Examples 1 to 8, wherein the serving cell comprises a secondary cell, wherein the beam failure recovery is performed for the PDCCH of the second TRP by transmitting a beam failure indication in a different secondary cell, and wherein the beam failure indication comprises a medium access control (MAC) control element (CE) indicating a new beam for the PDCCH of the second TRP.

Example 10 is the method of any of Examples 1 to 9, wherein the serving cell comprises a special cell, and wherein the special cell comprises one of a primary cell or a primary secondary cell group cell.

Example 11 is the method of any of Examples 1 to 10, wherein the first TRP comprises a primary TRP, and wherein the second TRP comprises a secondary TRP, the method further comprising: performing a random access channel (RACH) procedure indicating a new beam for a PDCCH of the primary TRP, wherein a physical RACH (PRACH) preamble is transmitted in a PRACH occasion associated with the new beam during the RACH procedure.

Example 12 is a device including one or more processors and one or more memories in electronic communication with the one or more processors storing instructions executable by the one or more processors to cause the system or apparatus to implement a method as in any of Examples 1-11.

Example 13 is a system or apparatus including means for implementing a method or realizing an apparatus as in any of Examples 1-11.

Example 14 is a non-transitory computer readable medium storing instructions executable by one or more processors to cause the one or more processors to implement a method as in any of Examples 1-11.

Example 15 is a method of wireless communication at a base station in communication with a first transmission reception point (TRP) in a serving cell, the base station comprising a second TRP in the serving cell, the method comprising: transmitting data to a user equipment (UE) based on a physical downlink control channel (PDCCH) of the second TRP, wherein the PDCCH of the second TRP is transmitted to the UE over a separate beam than a PDCCH of the first TRP; receiving a beam failure indication from the UE in response to a beam failure of the PDCCH of the first TRP; and configuring a new beam for the PDCCH of the first TRP based on the beam failure indication.

Example 16 is the method of Example 15, wherein the beam failure indication is received based on one or more reference signals of the first TRP and the second TRP.

Example 17 is the method of any of Examples 15 and 16, wherein the new beam is configured based on a beam failure recovery configuration comprising a set of candidate beams for the first TRP and the second TRP.

Example 18 is the method of any of Examples 15 to 17, wherein the new beam is configured for the PDCCH of the first TRP while the beam for the PDCCH of the second TRP is operational.

Example 19 is the method of any of Examples 15 to 18, wherein the beam failure indication comprises a medium access control (MAC) control element (CE) indicating the new beam for the PDCCH of the first TRP, and wherein the new beam is configured for the PDCCH of the first TRP based on a transmission configuration indicator (TCI) state indication for a UE-specific PDCCH MAC CE transmitted from the second TRP.

Example 20 is the method of any of Examples 15 to 19, wherein the beam failure indication comprises a medium access control (MAC) control element (CE) indicating the new beam for the PDCCH of the first TRP, and wherein another beam is configured for a physical downlink shared channel (PDSCH) of the first TRP based on a transmission configuration indicator (TCI) state activation indication for a UE-specific PDSCH MAC CE transmitted from the second TRP.

Example 21 is the method of any of Examples 15 to 20, further comprising: receiving a configuration of a new beam for the PDCCH of the second TRP in response to a beam failure of the PDCCH of the second TRP, the beam failure occurring before the new beam for the PDCCH of the first TRP is configured.

Example 22 is the method of any of Examples 15 to 21, wherein the serving cell comprises a secondary cell, and wherein the configuration of the new beam for the PDCCH of the second TRP is received from a third TRP in a different secondary cell.

Example 23 is the method of any of Examples 15 to 22, wherein the first TRP comprises a primary TRP, wherein the second TRP comprises a secondary TRP, and wherein the configuration of the new beam for the PDCCH of the secondary TRP is received from the primary TRP.

Example 24 is the method of any of Examples 15 to 23, wherein the second TRP comprises a primary TRP, and wherein the configuration of the new beam for the PDCCH of the primary TRP is based on a physical random access channel (PRACH) preamble received in a PRACH occasion associated with the new beam for the PDCCH of the primary TRP.

Example 25 is a device including one or more processors and one or more memories in electronic communication with the one or more processors storing instructions executable by the one or more processors to cause the system or apparatus to implement a method as in any of Examples 15-24.

Example 26 is a system or apparatus including means for implementing a method or realizing an apparatus as in any of Examples 15-24.

Example 27 is a non-transitory computer readable medium storing instructions executable by one or more processors to cause the one or more processors to implement a method as in any of Examples 15-24.

What is claimed is:

1. An apparatus for wireless communication at a user equipment (UE), comprising:
one or more memories; and
one or more processors coupled to the one or more memories and configured to:
receive, via separate beams for a physical downlink control channel (PDCCH) of a first transmission reception point (TRP) and a second TRP in a serving cell, data from the first TRP and the second TRP;
detect a beam failure of the PDCCH of the first TRP; and
perform a beam failure recovery for the PDCCH of the first TRP by a transmission of a beam failure indication indicating a new beam for the PDCCH of the first TRP.

2. The apparatus of claim 1, wherein to detect the beam failure, the one or more processors are configured to detect the beam failure based on one or more reference signals configured for the first TRP and the second TRP.

3. The apparatus of claim 1, wherein to perform the beam failure recovery, the one or more processors are configured to perform the beam failure recovery based on a beam failure recovery configuration comprising a set of candidate beams for at least one of the first TRP or the second TRP.

4. The apparatus of claim 1, wherein to detect the beam failure, the one or more processors are configured to detect the beam failure for the first TRP independently from the second TRP.

5. The apparatus of claim 1, wherein to perform the beam failure recovery, the one or more processors are configured to perform the beam failure recovery for the PDCCH of the first TRP while a beam for the PDCCH of the second TRP is operational.

6. The apparatus of claim 1, wherein the beam failure indication comprises a medium access control (MAC) control element (CE) indicating the new beam for the PDCCH of the first TRP, and wherein to perform the beam failure recovery, the one or more processors are configured to perform the beam failure recovery for the PDCCH of the first TRP based on a transmission configuration indicator (TCI) state indication for a UE-specific PDCCH MAC CE of the second TRP.

7. The apparatus of claim 1, wherein the beam failure indication comprises a medium access control (MAC) control element (CE) indicating the new beam for the PDCCH of the first TRP, and wherein to perform the beam failure recovery, the one or more processors are configured to perform the beam failure recovery further based on a physical downlink shared channel (PDSCH) of the first TRP based on a transmission configuration indicator (TCI) state activation indication for a UE-specific PDSCH MAC CE of the second TRP.

8. The apparatus of claim 1, wherein the one or more processors are further configured to:
detect a beam failure of the PDCCH of the second TRP; and
perform a beam failure recovery for the PDCCH of the second TRP at a same time as the performance of the beam failure recovery for the first TRP.

9. The apparatus of claim 8, wherein the serving cell comprises a secondary cell, wherein to perform the beam failure recovery for the PDCCH of the second TRP, the one or more processors are configured to transmit a second beam failure indication in a different secondary cell, and wherein the second beam failure indication comprises a medium access control (MAC) control element (CE) indicating a second new beam for the PDCCH of the second TRP.

10. The apparatus of claim 8, wherein the serving cell comprises a special cell, and wherein the special cell comprises one of a primary cell or a primary secondary cell group cell.

11. The apparatus of claim 10, wherein the first TRP comprises a primary TRP, wherein the second TRP comprises a secondary TRP, and wherein the one or more processors are further configured to:
perform a random access channel (RACH) procedure indicating the new beam for the PDCCH of the primary TRP, wherein to perform the RACH procedure, the one or more processors are configured to transmit a physical RACH (PRACH) preamble in a PRACH occasion associated with the new beam during the RACH procedure.

12. The apparatus of claim 1, further comprising at least one of a transceiver or an antenna coupled to the one or more processors.

13. An apparatus for wireless communication at a base station, wherein the base station is in communication with a first transmission reception point (TRP) in a serving cell, wherein the base station comprises a second TRP in the serving cell, and wherein the apparatus further comprises:
one or more memories; and
one or more processors coupled to the one or more memories and configured to:
transmit, for a user equipment (UE) via a beam for a physical downlink control channel (PDCCH) of the second TRP that is separate from a beam for a PDCCH of the first TRP, data from the second TRP;
receive, from the UE, a beam failure indication in response to a beam failure of the PDCCH of the first TRP; and
configure a new beam for the PDCCH of the first TRP based on the beam failure indication.

14. The apparatus of claim 13, wherein to receive the beam failure indication, the one or more processors are configured to receive the beam failure indication based on one or more reference signals configured for the first TRP and the second TRP.

15. The apparatus of claim 13, wherein to receive the beam failure indication, the one or more processors are configured to receive the beam failure indication based on one or more reference signals of at least one of the first TRP or the second TRP.

16. The apparatus of claim 13, wherein to configure the new beam, the one or more processors are configured to configure the new beam for the PDCCH of the first TRP while a beam for the PDCCH of the second TRP is operational.

17. The apparatus of claim 13, wherein the beam failure indication comprises a medium access control (MAC) control element (CE) indicating the new beam for the PDCCH of the first TRP, and wherein to configure the new beam, the one or more processors are configured to configure the new beam for the PDCCH of the first TRP based on a transmission configuration indicator (TCI) state indication for a UE-specific PDCCH MAC CE of the second TRP.

18. The apparatus of claim 13, wherein the beam failure indication comprises a medium access control (MAC) control element (CE) indicating the new beam for the PDCCH of the first TRP, and wherein the one or more processors are further configured to:
configure another beam for a physical downlink shared channel (PDSCH) of the first TRP based on a transmission configuration indicator (TCI) state activation indication for a UE-specific PDSCH MAC CE of the second TRP.

19. The apparatus of claim 13, further comprising at least one of a transceiver or an antenna coupled to the one or more processors.

20. A method of wireless communication at a user equipment (UE), comprising:
- receiving, via separate beams for a physical downlink control channel (PDCCH) of a first transmission reception point (TRP) and a second TRP in a serving cell, data from the first TRP and the second TRP;
- detecting a beam failure of the PDCCH of the first TRP; and
- performing a beam failure recovery for the PDCCH of the first TRP by a transmission of a beam failure indication indicating a new beam for the PDCCH of the first TRP.

* * * * *